United States Patent
Dale et al.

(10) Patent No.: US 10,341,185 B2
(45) Date of Patent: Jul. 2, 2019

(54) DYNAMIC SERVICE INSERTION

(71) Applicant: Arista Networks, Inc., Santa Clara, CA (US)

(72) Inventors: Lincoln T. Dale, Mountain View, CA (US); Ben C. DeBolle, Los Altos Hills, CA (US); Anshul Sadana, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 14/874,277

(22) Filed: Oct. 2, 2015

(65) Prior Publication Data

US 2017/0099187 A1    Apr. 6, 2017

(51) Int. Cl.
| | | |
|---|---|---|
| H04L 29/06 | (2006.01) | |
| G06F 12/14 | (2006.01) | |
| H04L 9/32 | (2006.01) | |
| G06F 15/173 | (2006.01) | |
| H04L 12/24 | (2006.01) | |

(52) U.S. Cl.
CPC ...... *H04L 41/0893* (2013.01); *H04L 41/0816* (2013.01); *H04L 41/12* (2013.01); *H04L 41/5054* (2013.01); *H04L 63/0209* (2013.01); *H04L 41/5077* (2013.01)

(58) Field of Classification Search
CPC . H04L 41/0893; H04L 41/12; H04L 63/0209; H04L 41/0816
USPC ...... 726/11, 22; 713/153, 168; 709/223, 238
See application file for complete search history.

(56) References Cited

U.S. PATENT DOCUMENTS

| | | | |
|---|---|---|---|
| 8,190,755 B1 * | 5/2012 | Satish | H04L 63/102 709/225 |
| 8,875,223 B1 | 10/2014 | Chen et al. | |
| 2002/0032717 A1 * | 3/2002 | Malan | H04L 12/2602 718/105 |
| 2002/0194362 A1 * | 12/2002 | Rawlins | H04L 45/10 709/235 |
| 2007/0174659 A1 | 7/2007 | Takuwa et al. | |
| 2008/0155252 A1 * | 6/2008 | Nambiar | H04L 12/4633 713/153 |
| 2009/0310165 A1 * | 12/2009 | Olsson | G06F 9/4411 358/1.15 |
| 2010/0043068 A1 * | 2/2010 | Varadhan | H04L 12/4633 726/15 |

(Continued)

*Primary Examiner* — Aravind K Moorthy
(74) *Attorney, Agent, or Firm* — Womble Bond Dickinson (US) LLP

(57) ABSTRACT

Various embodiments are described herein to enable physical topology independent dynamic insertion of a service device into a network. One embodiment provides for a network system comprising a set of network elements to interconnect a set of host devices, the set of network elements having a physical topology defined by the physical links between network elements in the set of network elements, and a network management device including a network management module to monitor and configure the set of network elements, the network management module to configure the set of network elements to enable dynamic insertion of a network service device into the network to logically couple to one or more host devices in the set of host devices to the network service device independently of a location of the one or more host devices and the network service device within the physical topology.

25 Claims, 21 Drawing Sheets

(56) References Cited

U.S. PATENT DOCUMENTS

| | | | |
|---|---|---|---|
| 2010/0306408 A1* | 12/2010 | Greenberg | H04L 12/4633 709/238 |
| 2011/0023090 A1* | 1/2011 | Asati | H04L 12/4633 726/4 |
| 2011/0119390 A1 | 5/2011 | Leech et al. | |
| 2013/0083691 A1 | 4/2013 | Murphy et al. | |
| 2014/0169155 A1* | 6/2014 | Li | H04L 12/42 370/223 |
| 2015/0326535 A1* | 11/2015 | Rao | H04L 63/029 726/15 |
| 2016/0149751 A1* | 5/2016 | Pani | H04L 41/0668 370/221 |
| 2016/0171109 A1* | 6/2016 | Gnanasekaran | G06F 17/30867 707/733 |
| 2016/0261496 A1* | 9/2016 | Chang | H04L 12/4633 |
| 2016/0352538 A1* | 12/2016 | Chiu | H04L 12/6418 |
| 2017/0024260 A1* | 1/2017 | Chandrasekaran | G06F 9/45558 |
| 2017/0099182 A1* | 4/2017 | DeBolle | H04L 41/12 |

\* cited by examiner

DYNAMIC SERVICE INSERTION

FIELD OF INVENTION

This invention relates generally to data networking and more particularly to the dynamic insertion of network services devices.

BACKGROUND OF THE INVENTION

Historic legacy data center designs include a layer-3 network in the core or aggregation layer and layer-2 network having virtual local area networks (VLANs) southbound to the access layer, to which host devices are connected. In this design, service devices are deployed physically at the layer-3 to layer-2 boundary or on service aggregation devices attached on the boundary. Network traffic for specific VLANs always go through the configured service devices at the network boundary, presenting challenges as to how to scale out the service devices, for example, to add more firewall capacity. Additionally, any service devices and associated security policies can only exist at the network perimeter, and historic designs do not present any opportunity to implement network level security policies between hosts within the same layer-2 domain.

SUMMARY OF THE DESCRIPTION

Various embodiments are described herein to enable physical topology independent dynamic insertion of a service device into a network. Network service devices can be coupled to any network element within a set of network elements and can provide services to network devices at any location within the network.

One embodiment provides for a network system comprising a set of network elements to interconnect a set of host devices, the set of network elements having a physical topology defined by the physical links between network elements in the set of network elements, and a network management device including a network management module to monitor and configure the set of network elements, the network management module to configure the set of network elements to enable dynamic insertion of a network service device into the network to logically couple to one or more host devices in the set of host devices to the network service device independently of a location of the one or more host devices and the network service device within the physical topology.

One embodiment provides for a non-transitory machine-readable medium storing instructions which, when executed by one or more processors, cause the one or more processors to perform operations in response to the coupling of a network service device to the network, the operations comprising verifying availability of resources to implement insertion of the network service device and enabling network data re-direction for the network service device, wherein enabling network data re-direction includes configuring a network element to re-direct data flow associated with a client of the network service device independently of the physical location of the network service device within the network.

One embodiment provides for a network element comprising a control plane including logic to receive configuration data for the network element, the configuration data to cause the network element to configure a network tunnel having a first endpoint at a network service device that provides a network service to one or more network service client devices coupled to the network element and a second endpoint at one or more of the network service client devices, and a data plane to forward network data from a first interface coupled to the one or more network service client devices and a second interface coupled to the network service device over the network.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
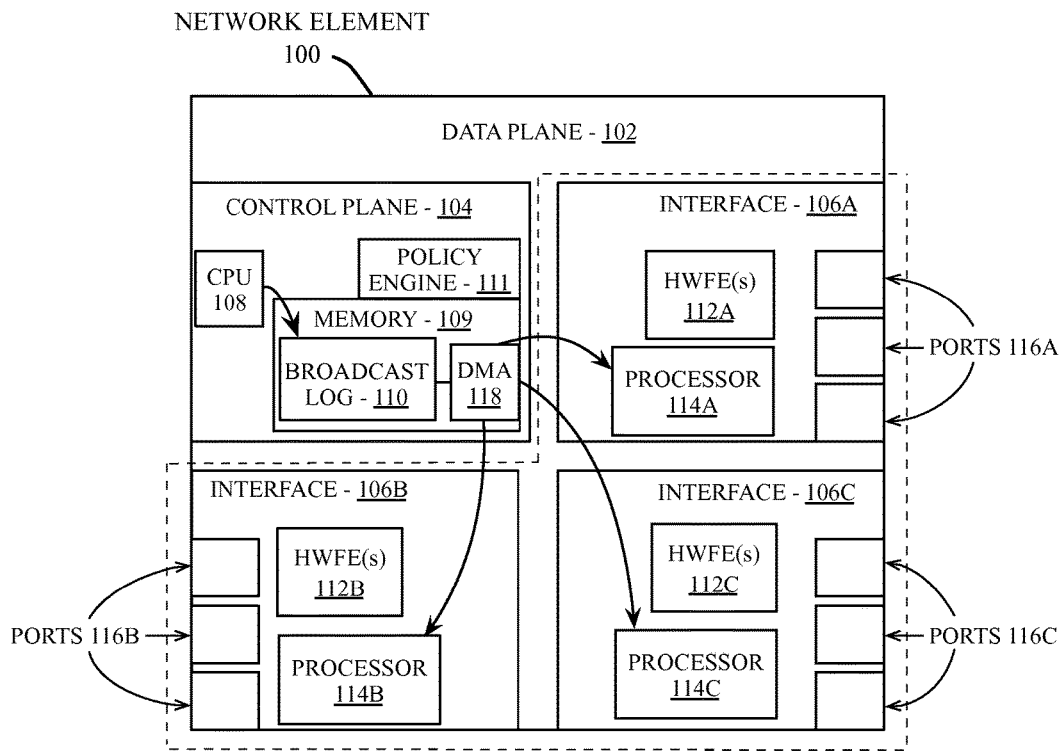
FIG. 1 is a block diagram of one embodiment of a network element including a data plane coupled to a control plane and several interface devices.

A key difficulty in implementing of scalable data center networks within enterprise environments is the implementation of dynamic service insertion of service devices like firewalls and load balancers. In embodiments described herein, dynamic service insertion (DSI) provides a software and hardware-based dynamic and scalable method to inserting service devices into the path of network traffic without regard to whether the service device or end device is a physical or virtual device and with complete flexibility as to the physical network location of the service and end devices.

In one embodiment DSI provides flexibility on locality of devices. Service devices (e.g., firewall devices, web-caches, load balancer, distributed denial of service (DDOS) scrubbers, etc.) can be coupled to any network element within the network and can provide services to devices that are physically located at any position within the network. DSI can be provided, in one embodiment, without requiring any additional frame formats, traffic steering, or metadata fields in any new network data header fields. DSI can be provided in a non-proprietary implementation, in which standards-based forwarding is used to stitch service devices into the path of traffic. DSI can be provided dynamically and in real time to provide dynamic responsiveness to host movement within the network.

In one embodiment, DSI provides services on a per-policy basis. For example, a service device coupled to the physical network can provide a service policy (e.g., security policy) and DSI can dynamically configure the network to implement the service policy for the device. DSI can be implemented in part by communicating with service devices using the native application programming interface (API) of the service device. Using the native device APIs, a network management infrastructure implementing DSI can discover policies for service devices coupled to the network by querying the service devices and dynamically instantiate the services based on the policies defined on the service device.

In one embodiment, a service policy monitor (SPM) agent executing on the network management infrastructure can monitor the set of policies on of some or all of the service devices on the network. The SPM can be configured to periodically poll each device for service policy changes and modify the DSI configuration based on the service policy or changes within the service policy. In one embodiment, the SPM can be configured for event-driven monitoring, such that, in response to a network event, such as but not limited to the discovery of a new device or a change in network configuration, the SPM can read the current set of policies on some or all of the service devices and respond to any changes in the policies.

DSI can generally be implemented in, but is not limited to datacenter environments. Service devices can be configured and re-configured by service device administrators without requiring the intervention of network administrators to change any software configuration and/or physically position or re-position devices within the network. DSI can also operation in conjunction with virtual service devices and can communicate with 3$^{rd}$ party service device vendors to enable the dynamic insertion and network configuration for on-demand virtual service devices. DSI can also be configured to enable virtual client device movement across hosts in the network, such that the network is automatically re-configured to allow services used by the virtual client devices to follow the virtual client device.

Embodiment described herein can be implemented in a network including enterprise level network elements (e.g., switch, router, etc.) having an extensible operating system including a state monitoring agent that can be configured to report all configuration state and status changes on the network element. In one embodiment, all or substantially all changes to the network element, including network interface counters, are reported in substantially real time to a collector node, or an interface node of the collector node. As opposed to polling systems such as SNMP that can be used to poll or retrieve data from a network element, the state monitoring agent enabled by embodiments described herein actively pushes all configuration state and status changes that occur on a network element.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network Elements and Network System

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network element 100 that includes a data plane 102 coupled to a control plane 104 and several interface devices 106A-C. In some network elements, the data plane 102 is referred to as the forwarding plane. In one embodiment, the control plane 104 includes central processing unit (CPU) 108 and memory 109 to store data. The CPU 108 can be used to process information for the control plane 104 and write configuration data for hardware forwarding engines 112A-C in the network interface devices 106A-C. Additionally, the CPU can read data from the hardware forwarding engines 112A-C, in one embodiment, using the broadcast log 110. In one embodiment, the data plane 102 receives, processes, and forwards network data using various configuration data (e.g., forwarding, security, quality of service (QoS), and other network traffic processing information). The data plane 102 includes multiple network interface devices 106A-C (e.g., switches, routers, etc.) that can each receive, process, and/or forward network traffic. Each of the interface devices 106A-C includes multiple ports 116A-C that are used to receive and transmit network data.

In one embodiment, for each received unit of network data, the data plane 102 determines a destination address for the network data, looks up the requisite information for that destination in one or more tables stored in the data plane, and forwards the data out the proper outgoing interface, for example, one of the interface devices 106A-C. In one embodiment, each of the interface devices 106A-C includes one or more hardware forwarding engines (HWFE(s)) 112A-C, processor 114A-C, and ports 116A-C, respectively. Each of the hardware forwarding engines 112A-C forwards data for the network element 100 by performing routing, switching, or other types of network forwarding. Each processor 114A-C can be used to accelerate various functions of the interface devices 106A-C. For example and in one embodiment, the processors 114A-C can read and write from a broadcast log 110 in the control plane 104 to program the corresponding hardware forwarding engines 112A-C. The processors 114A-C can also push data from the hardware forwarding engines 112A-C to a CPU 108 in the control plane 104.

In one embodiment, the control plane 104 gathers the configuration data for the hardware forwarding engines 112A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), XML APIs, JSON APIs, Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 112A-C.

In one embodiment, the memory 109 that is used to store data for the control plane 104 is shared with the data plane 102. In such embodiment a direct memory access (DMA) controller 118 is coupled to the memory 109 to allow processors 114A-C direct access to the memory 109. In one embodiment, the DMA controller 118 allows the processors 114A to directly access the broadcast log 110 without requiring the CPU 108 in the control plane 104 to send data to each processor 114A-C. In one embodiment, the control plane 104 includes a policy engine 111 to apply a QoS policy to network traffic flowing through the network element 100. The policy engine 111 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 102 of each network element 100.

The network element 100 can be incorporated into a network as any one or more of a switch, router, hub, bridge, gateway, etc., or any type of device that can provide access to a network (e.g., physical network, virtualized network, etc.). In various embodiments, different types of protocols can be used to communicate network (e.g., Ethernet, wireless, Synchronous Optical Networking (SONET), Fiber channel, Infiniband, etc.). The network data being communicated by the data plane 102 can be a stream of network frames, datagrams or data packets, or other types of discretely switched network data. In one embodiment, the network element 100 communicates network data between various networked devices using a variety of communicating techniques (e.g., layer-2 switching, layer-3 routing, traffic shaping, applying a quality of service (QoS) policy, etc.).

Figure 2:
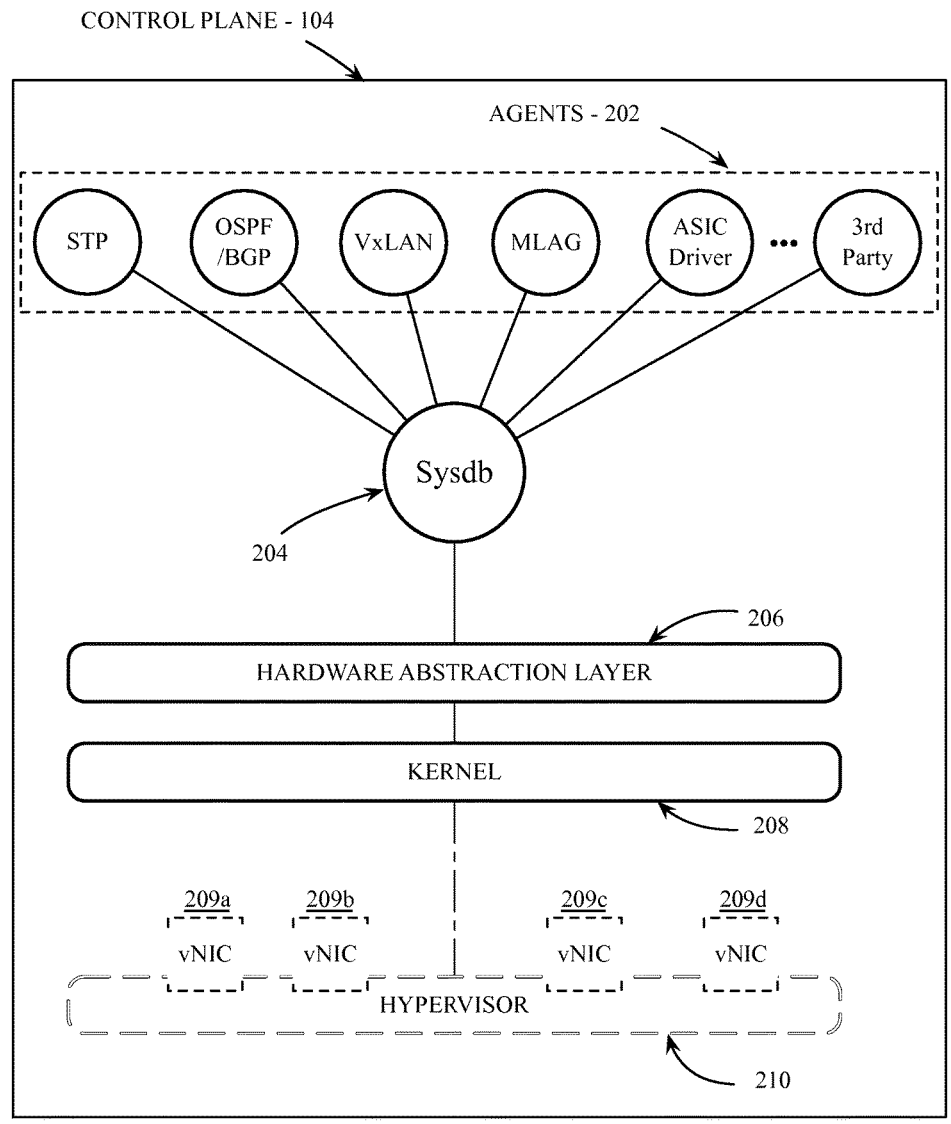
FIG. 2 is a block diagram of a network element software system, according to an embodiment.

FIG. 2 is a block diagram of a network element software system 200, according to an embodiment. In one embodiment, the network element software system 200 resides in the control plane (e.g., control plane 104) of a network element 100 as in FIG. 1. The network element software system 200 includes multiple software agents 202 including, but not limited to agents to perform operations to implement Spanning Tree Protocol (STP), Open Shortest Path First (OSPF)/Border Gateway Protocol (BGP), Virtual eXtensible LAN (VxLAN), and Multi-Chassis Link Aggregation (MLAG). The agents can additionally include one or more forwarding ASIC drivers as well as third-party agents. In one embodiment, the agents each communicate with a central system database (e.g., Sysdb 204). In one embodiment, the software system 200 additionally includes a hardware abstraction layer 206 to abstract hardware specific details to enable the network element software system 200 to operate on a variety of different hardware associated with different models and implementations of network elements. A kernel 208 provides core operating system functionality such as scheduling and base level system resource management. In one embodiment, the network element software system 200 can be operated within a virtual machine, and can provide virtual network interface cards (vNIC 209a-d) via a hypervisor 210.

In one embodiment, each of the multiple agents 202 interfaces with the Sysdb 204 to record configuration state and operational status. In such embodiment, agents in the system mount can mount the Sysdb 204 to send and receive configuration and status. Read and write permissions can be specified for each mount. In one embodiment, Sysdb utilizes an event-driven publish/subscribe model. If the configuration state of an agent changes, Sysdb can send an event notification to that agent, which will then update its local copy. Similarly when the agent writes to the Sysdb mount, the agent changes its local copy and the write returns immediately. This change notification can be buffered and asynchronously sent to Sysdb, which then notifies all other agents who have subscribed to the changed agent. In one embodiment Sysdb information is maintained in RAM, along with other status and state information, and once the network element is turned off or restarted, such information is lost. In other embodiments, network elements include a sufficient amount of sufficiently high performance local storage to store Sysdb information in non-volatile memory.

In embodiments described herein, network element configuration status and operational state agent transmits Sysdb information, as well as forwarding configuration data, to one or more centralized collector nodes that archive status and status information for multiple network elements on a network. The collected information can include all data in shared memory of the network element, including but not limited to interface tables, ARP tables and routing tables, system logs (e.g., syslog, agent logs), and hardware specific state, such as interface counters, service counters, etc. In one embodiment, data visible to the kernel 208 and/or hardware abstraction layer 206 can also be collected.

Figure 3:
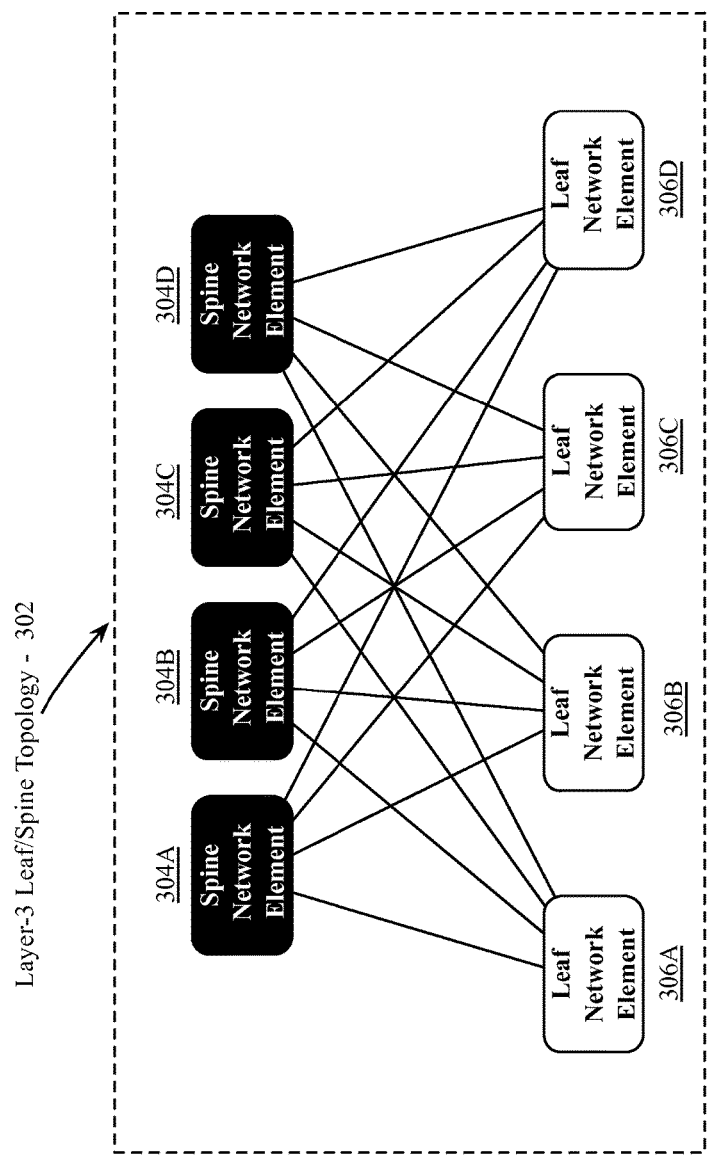
FIG. 3 is an illustration of a layer-3 protocol fabric, according to an embodiment.

FIG. 3 is an illustration of a layer-3 protocol fabric 300, according to an embodiment. The layer-3 protocol fabric 300 has a leaf/spine topology 302 in which a set of spine network elements 304A-D are coupled to a set of leaf network elements 306A-D over a multi-path switching fabric. The leaf/spine topology 302 is an alternate to the traditional three-layer core/aggregation/access network architecture. The leaf network elements 306A-D mesh into the spine network elements 304A-D using a layer-3 (e.g., TCP/IP) protocol. The spine network elements 304A-D provide the core data connections for the network, while the leaf network elements 306A-D provide access to the network for host devices (e.g., servers, workstations, virtual machines). In one embodiment, all routes through the network are configured in an active state through the use of Equal-Cost Multi-pathing (ECMP), allowing all connections to be utilized while avoiding loops within the network.

Figure 4:
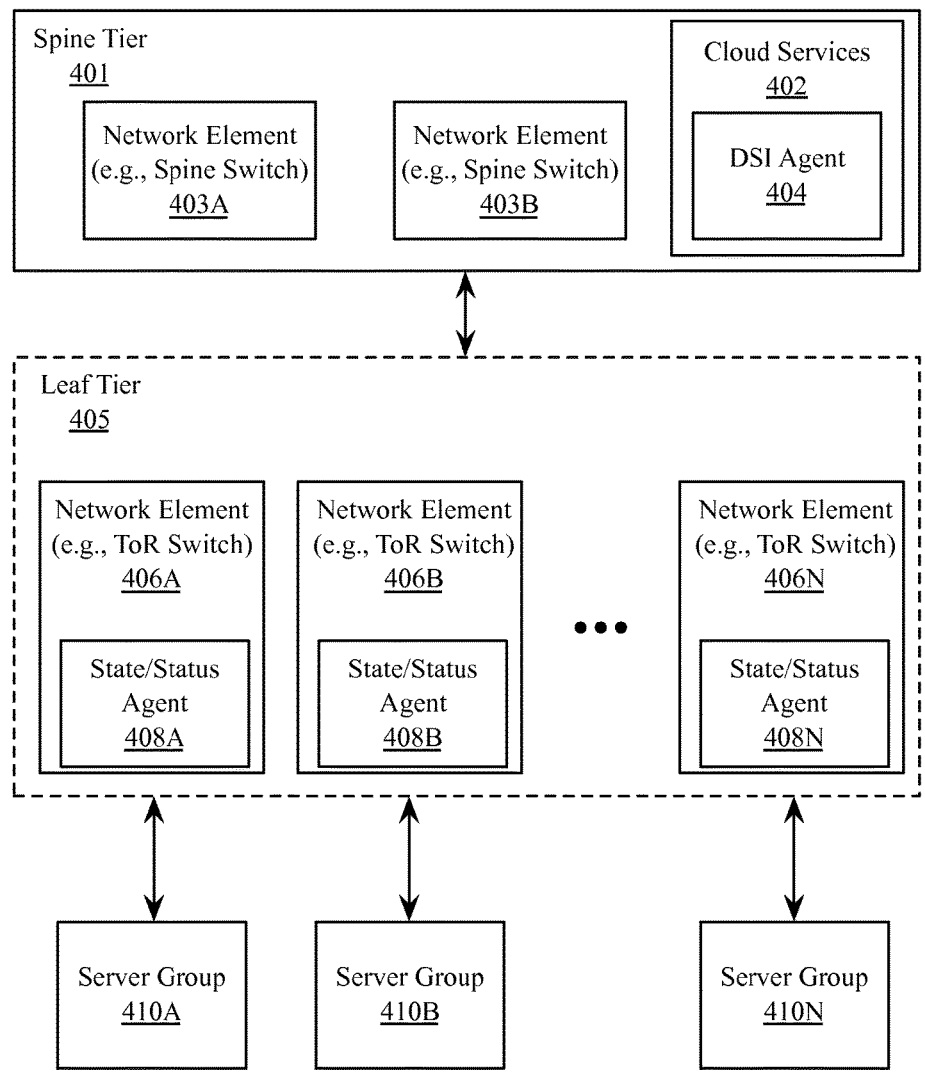
FIG. 4 is a block diagram of a network system, according to an embodiment.

FIG. 4 is a block diagram of a network system 400, according to an embodiment. The network system 400 can be implemented on the layer-3 leaf/spine topology 302 of FIG. 3 and includes a spine tier 401 and a leaf tier 405. The leaf tier 405 includes one or more network elements (e.g., network elements 406A-N). Each of the network elements 406A-N of the leaf tier 405 can couple to a server group 410A-N, where each server group includes one or more servers. In one embodiment, each network element of the leaf tier 405 can be configured as a top of rack (ToR) switch, although other datacenter configurations for the network system 400 may be used (e.g., End of Row, etc.). Each of the network elements 406A-N of the leaf tier 405 can couple to a network element 403A-B in the spine tier 401.

In one embodiment, each of the network elements 406A-N includes a state/status agent 408A-N to report changes in configuration state and operational status for each of the network elements 406A-N. The state/status agents 408A-N can transmit the configuration state and status changes to one or more collector nodes (not shown) which may reside, for example, in the spine tier 401, in the leaf tier 405, as or a member of one or more of the server groups 410A-N. While the state/status agents 408A-N are shown with respect to the network elements 406A-N of the leaf tier 405, each network element (e.g., network element 403A-B) in the spine tier 401 can also include a state/status agent. In one embodiment, all network elements within the network system 400 include a separate state/status agent to proactively transmit state and status changes within the network element.

In one embodiment, the state/status agents 408A-N can be used to set or change the configuration state of each of network elements 403A-B and 408A-N. The state/status agents 408A-N can work in conjunction with a cloud services module 402, for example, in the spine tier 401, to configure each of network elements 403A-B and network elements 406A-N to implement service policies for a dynamically inserted service device. In one embodiment, the cloud services module 402 is a network management module including a DSI agent 404, which is a software module configured to work in conjunction with the cloud services module 402 to facilitate the dynamically insertion of service modules, service devices, and virtual service devices into the network.

All of the aforementioned components may be co-located in the same physical location. Alternatively, the aforementioned components may not all be co-located. While each server group 410A-N is shown as connecting to a single network element in the leaf tier 405, one or more of the network elements 406A-N may support Multi-chassis Link Aggregation (MLAG), in which a given network element in the leaf tier 405 may be directly connected to one other network element. In such configuration, multiple servers within a single server group or multiple server groups may be connected to each of the network elements in the configured MLAG domain.

Each of the network elements 406A-N in the leaf tier 405, as well the network elements 403A-B of the spine tier 401, can include components illustrated with respect to the network element 100 of FIG. 1, including a control plane 104 having a CPU 108 to execute the illustrated state/status agents 408A-N of the network system 400 of FIG. 4. Each network element of the network system 400 can also include a network element software system (e.g., operating system) such as the network element software system 200 of FIG. 2, which can have components including but not limited to the various agents 202 illustrated in FIG. 2.

Dynamic Service Insertion into Exemplary Network Topologies

Figure 5:
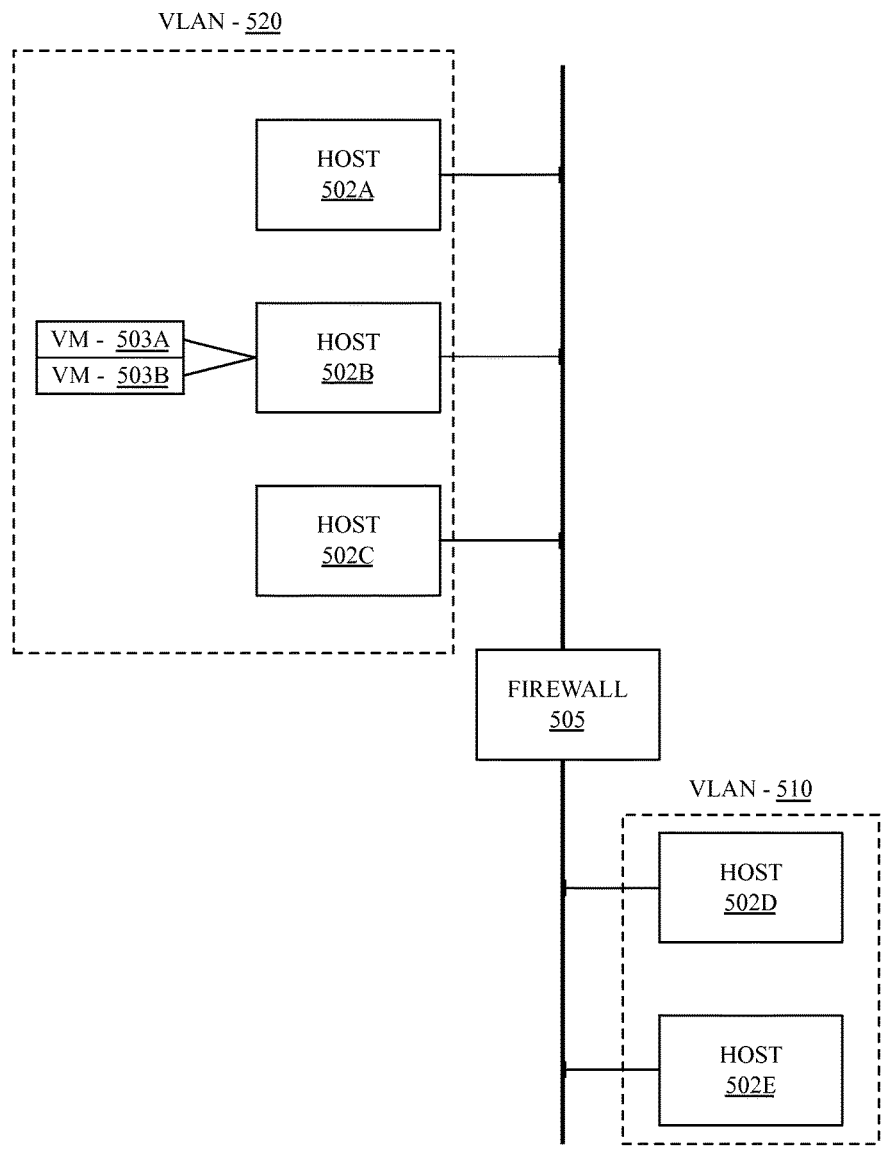
FIG. 5 illustrates an exemplary network service topology prior to the dynamic insertion of a network service device.

FIG. 5 is a block diagram of an exemplary network service topology 500 prior to the dynamic insertion of a network service device. As illustrated, a firewall service device 505 is configured to provide a firewall service between a first set of host devices 502A-C and a second set of host devices 502D-E. The host devices 502A-E can be members of the server group 410A-N illustrated in FIG. 4, or can be workstation devices, or other devices coupled to the network. In one embodiment, one or more of the host devices (e.g., host 502B) can include one or more virtual machines 503A-B. In one embodiment, the first set of host devices 502A-C can be part of a first VLAN (e.g., VLAN 520), while the second set of host devices 502D-E can be part of a second VLAN (e.g., VLAN 510).

Where the illustrated network service topology 500 is a logical topology, the illustrated topology can be realized by physically inserting a firewall service device 505 between network elements to which hosts 502A-C and hosts 502D-E are connected. For example, where the hosts of the first VLAN 520 are coupled to a first set of one or more network elements and the hosts of the second VLAN 510 are coupled to a second set of one or more network elements, the firewall service device 505 can be physically positioned between the first and second set of network elements. In other words, the logical topology of the network is dependent upon the physical topology of the network. In a traditional network configuration (e.g., using active/passive links and spanning tree protocol), it may be possible to physically configure all network traffic to flow from hosts 502A-C in the first VLAN 520 to hosts 502D-E in the second VLAN 510 by physically routing the network traffic through the firewall service device 505. In a leaf/spine topology, such as the layer-3 leaf/spine topology 302 of FIG. 3, the firewall service device 505 is most readily positioned above the spine tier (e.g., "north" of the spine network elements 304A-D). In such multi-path network topologies, it may be substantially more difficult to insert service devices, particularly security related service devices such as the firewall service device 505, when the service device is intended to filter network traffic flowing between hosts coupled to leaf network elements, without significantly restraining the number of available paths between network elements, which can significantly reduce network performance.

Figure 6:
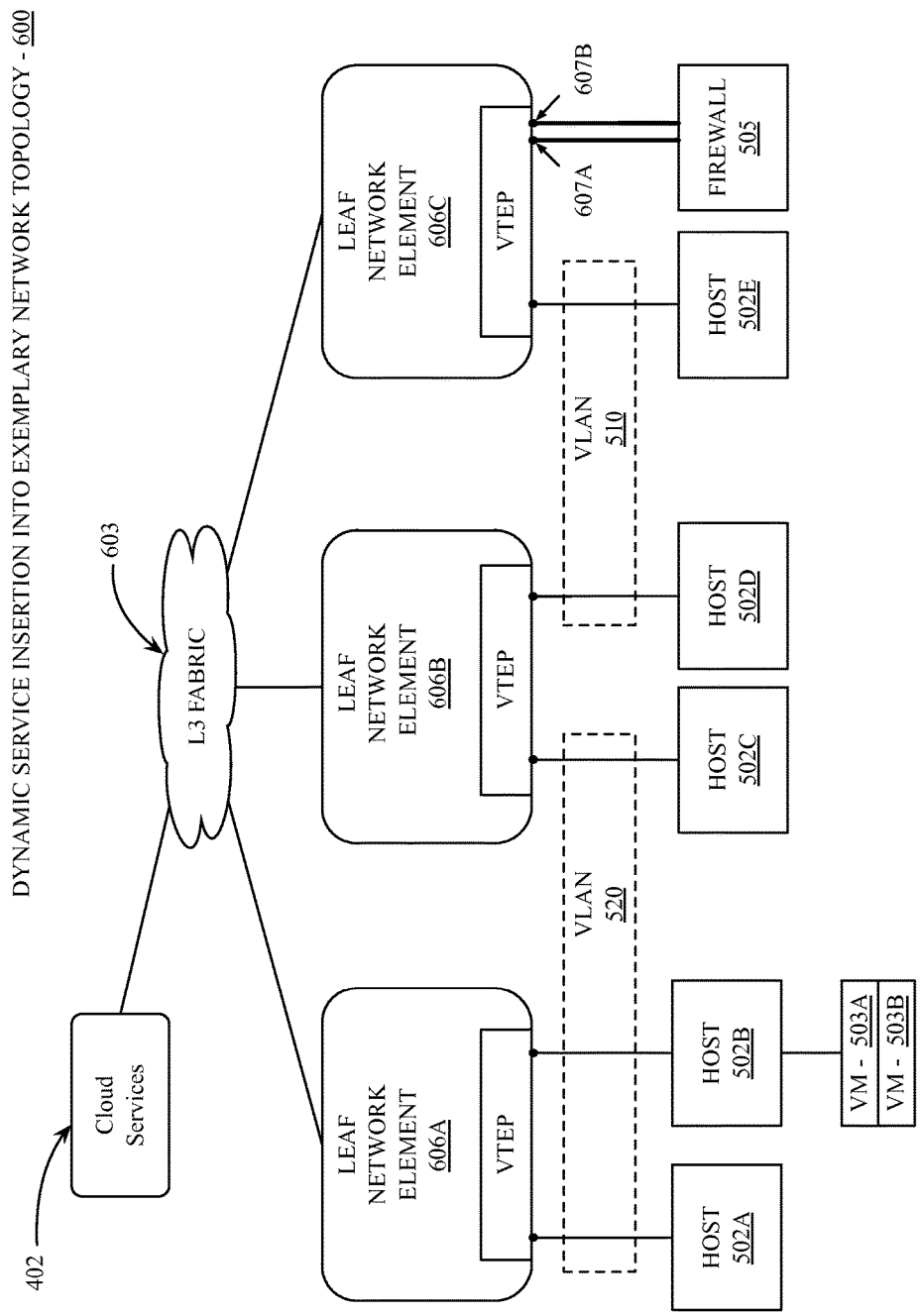
FIG. 6 is a block diagram of dynamic service insertion into the exemplary network topology, according to an embodiment.

FIG. 6 is a block diagram of dynamic service insertion into the exemplary network topology 600, according to an embodiment. The exemplary network topology 600 includes a layer-3 fabric 603 that interconnects several leaf network elements 606A-C. Host devices 502A-C on the first VLAN 520 couple to a first leaf network element 606A, where host device 502B includes VMs 503A-B. Host device 502C on the first VLAN 520 couples to a second leaf network element 606B. Host device 502D on the second VLAN 510 couples to the second leaf network element 606B. Host device 502E on the second VLAN 510 couples to the third leaf network element 606C. In one embodiment each host device 502A-E couples to a virtual tunnel end point (VTEP), which is a VLAN/VxLAN gateway to provide encapsulation and de-encapsulation services for the VLAN traffic, enabling multiple virtual layer-2 networks to exist within the layer-3 network.

The cloud services module 402 contains a DSI agent 404, as shown in FIG. 4, and can dynamically configure an attached service device, such as the firewall service device 505. The firewall service device 505 can couple to a VTEP via two interfaces 607A-B, where a first interface connection 607A can be defined as an "inside" interface, while a second interface connection 607B can be defined as an "outside" interface.

In one embodiment, the firewall service device 505 can be dynamically inserted into the network based on policies defined on the device. The policies can be defined by and/or stored on the firewall service device 505 and the cloud services module 402 can be configured to communicate with the service device to retrieve the defined policies. In one embodiment each policy can be tied to a specific network element (e.g. apply policy to leaf network element 606A port Et10 to host 502A). However, a policy can also be tied to a specific device via an address, such as Internet Protocol (IP) address, a VLAN+MAC address, or a VM name. Where a policy is tied to a device, should the device change location in the network, the policy can migrate with the device. For example and in one embodiment, should VM 503A or VM 503B migrate from host 502B to host 502C, the network configuration used to implement the policies associated with the migrating VM will automatically adjust in response to the movement.

Figure 7:
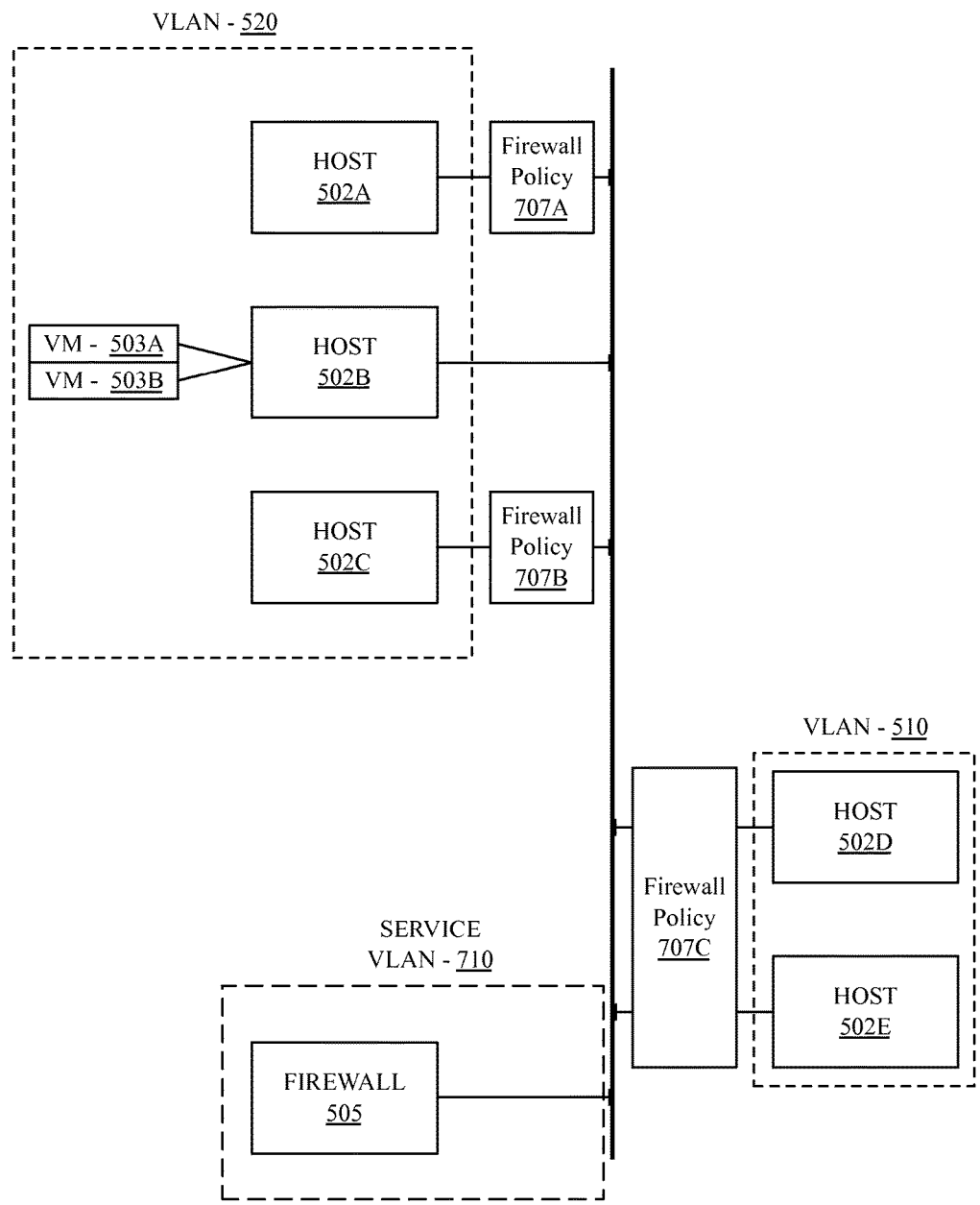
FIG. 7 is a block diagram of an exemplary network service topology after the dynamic insertion of a network service device.

FIG. 7 is a block diagram of an exemplary network service topology 700 after the dynamic insertion of a network service device. As illustrated, the exemplary network service topology 700 is a version of the exemplary network service topology 500 of FIG. 5 using DSI to dynamically insert the firewall service device 505.

In one embodiment, DSI operates by intercepting network traffic from or destined to a device or host associated with a policy. The traffic from the device or host can be intercepted before the traffic is inserted into the normal VLAN associated with the host. According to the policy defined for the host or device, network traffic arriving at an associated interface can be redirected towards a specified interface for the service device. A policy can be defined for each host or multiple hosts can share a policy.

For example a set of firewall policies 707A-C can be defined such that host 502A and host 502C are specified to be on one side of the firewall service device 505 and host 502D and host 502E can be specified to be on the opposite side of the firewall service device 505, even though traffic is not physically required to be routed through the firewall service device 505 based on the physical location of the device within the network. For example, the firewall service device 505 can be coupled to the third leaf network element 606C as illustrated in FIG. 6. A first firewall policy 707A can specify that network traffic from host 502A should be intercepted and routed to a service VLAN 710 instead of being placed onto the first VLAN 520. A second firewall policy 707B can specify that network traffic from host 502C should be intercepted and routed to the service VLAN 710 instead of being placed onto the first VLAN 520. A third firewall policy 707C can specify that network traffic from host 502D and host 502E should be intercepted and routed to a service VLAN 710 instead of being placed onto the second VLAN 510. Any other devices, such as host 502B can use normal forwarding techniques.

In one embodiment a policy associated with a host can specify that re-directed traffic from a specific host should be tagged with specific dot1q tag to identify the traffic associated with the policy. In one embodiment, traffic associated with a policy can be tagged in a manner consistent with the IEEE 802.1q standard. IEEE 802.1q (e.g., dot1q) is a standard that supports VLANs on an IEEE 802.3 (e.g., Ethernet) network, and defines a system of tagging for Ethernet data and the accompanying procedures to be used by network elements that handle such data. For example, traffic from host 502A can be associated with a first policy and tagged with an exemplary dot1q tag of 100, while traffic from host 502C can be tagged with an exemplary dot1q tag of 101. Traffic from host 502D or host 502E can be tagged with an exemplary dot1q tag of 102. However, embodiments are not limited to dot1q tagging, and other tagging mechanisms known in the art may be used.

In one embodiment, using the policies specified for the service device (e.g., firewall service device 505), and the selected network data tagging mechanism, the network elements servicing the specified hosts are configured to re-direct traffic from the indicated hosts to a the service device by configuring a VLAN tunnel from the host to the service VLAN 710 associated with the device. The service device can then processes, filter, mirror, store, forward, etc., the network data based on the configuration of the service device. The specific operations performed on the network traffic can depend on the nature of the services provided by the service device and the configuration of the service device.

For example, the firewall service device 505 can receive a network data stream from host 502A, which has been configured to be on the "inside" interface or zone of the firewall. The firewall service device 505 can receive units of network data at an inside interface. The network data received at the inside interface arrives tagged with the service VLAN 710, the data having been translated from the first VLAN 520 based on the first firewall policy 707A. The firewall service device 505 can process the network data and based on configured device policies forward the units of network data associated with the data stream to an outside interface of the firewall service device 505. Any number of service policies can be applied to units of network data before forwarding the units of network data, including access control or content filtering/blocking.

The data can be transmitted from the outside interface of the firewall device 505 using the service VLAN 710 and the network element to which the firewall service device 505 is coupled (e.g., the third leaf network element 606C as in FIG. 6) can translate the data to the appropriate VLAN based on the destination of the network data and the forwarding tables stored in the network element.

Alternatively, the firewall service device 505 can receive a network data stream from host 502D, which has been configured to be on the "outside" interface or zone of the firewall. The firewall service device 505 can receive the units of network data from host 502D at the outside interface of the device. The network data received at the outside interface arrives tagged with the service VLAN 710, the data having been translated from the second VLAN 510 based on the third firewall policy 707C. The firewall service device 505 can process the network data and based on configured device policies, can then block network data.

Alternatively, based on the configured device policy, the firewall service device 505 can forward the network data to an inside interface of the firewall service device 505. The data can be transmitted from the inside interface of the firewall device 505 using the service VLAN 710 and in one embodiment, the network element to which the firewall service device 505 is coupled can translate the data to the appropriate VLAN based on the destination of the network data and the forwarding tables stored in the network element. In this example, the data may be destined for one of the host 502A-C in the first VLAN 520, including a VM 503A-B executing on host 502B. In one embodiment, a network data unit can be translated back to the original VLAN of the unit of network data immediately before entering the service device by the network element on the last hop before the service device.

In one embodiment, the firewall service device 505 is configured such that host 502B and/or VMs 503A-B are in an "untrusted" security zone that is outside the firewall with respect to host 502A, which is in a "trusted" security zone. The firewall service device 505 can also be configured such that any one of VMs 503A-B are on the outside interface or zone of the firewall service device 505, while host 502B is on the inside interface or zone of the service device. In one embodiment VM503A can be configured to be on the inside interface or zone of the service device while VM 503B can be configured to be on the outside interface or zone of the service device, and any traffic between the VMs 503A-B can be routed through the firewall service device 505. In one embodiment, services provided by the firewall service device 505 may be provided by a virtual service device executing as a virtual machine on any one of hosts 502A-E. The dynamic service insertion system can dynamically configure network forwarding based on the service policies associated with virtual service device in a manner similar to a physical service device.

Figure 8:
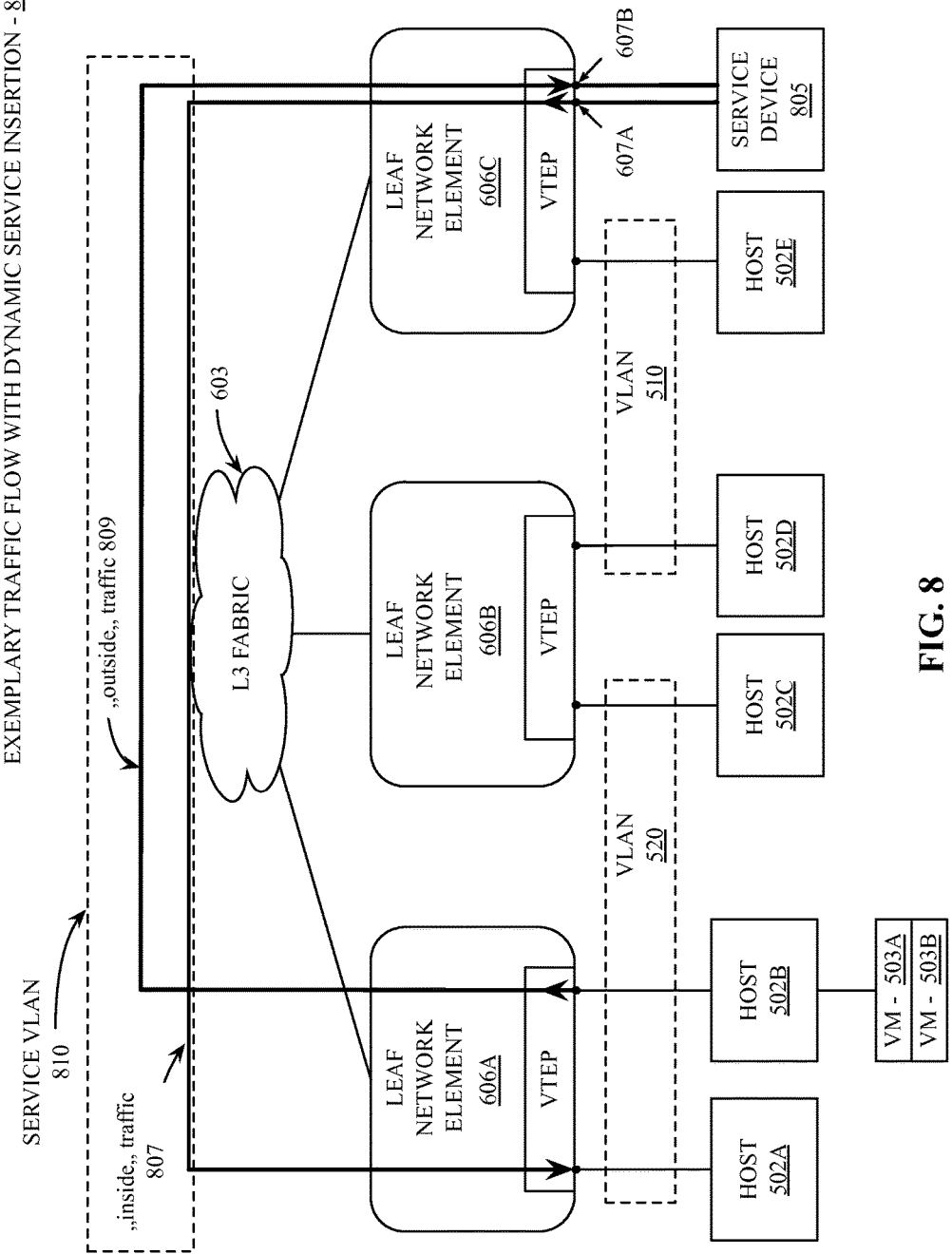
FIG. 8 shows an exemplary traffic flow for a network utilizing dynamic service insertion, according to an embodiment.

FIG. 8 shows an exemplary traffic flow 800 for a network utilizing dynamic service insertion, according to an embodiment. The exemplary traffic flow 800 illustrates communication between devices within the same VLAN 520, where a generic service device 805, which can be any service device, including the firewall service device 505, is dynamically inserted into the network and configured to filter traffic between host 502A and host 502B, where the traffic to/from host 502B may be associated with one or more of VMs 503A-B.

In one embodiment, the service device 805 receives a dedicated local VLAN (e.g., service VLAN 810) and a global virtual network identifier (VNI). A global DSI agent (e.g., DSI agent 404 as in FIG. 4) can manage the pool of VLANs and VNIs globally. The DSI agent can make the appropriate configuration changes to create the VLANS and VNIs on the network elements 606A-C. The DSI agent also periodically validates that the service network configuration is still applied to the network elements 606A-C.

The service VLAN 810 can be used to direct the flow of network data based on the policies of the dynamically inserted service device. As illustrated in FIG. 8, a service device 805 can designate traffic from a host (e.g., host 502B, VM 503A-B, etc.) as being from the outside zone of the service device 805 and designate translate traffic (e.g., units of network data, network data streams, etc.) as "outside" traffic 809. When a unit of network data associated with the outside traffic 809 is received at the VTEP of leaf network element 606A, the leaf network element 606A can translate the unit of network data from the origin VLAN of the data (e.g., VLAN 520) to a service VLAN 810 associated with the service device 805.

In one embodiment when network data designated as outside traffic 809 is received at the outside interface 607B for network element 606C, which is directly connected to the service device 805, the network element 606C can translate the network data back to the original VLAN. In one embodiment the network data remains on the service VLAN 810 until processed by the service device 805. The network data can be processed by the service device 805 and may be forwarded from the service device 805 via the outside interface 607A to the VTEP. Now that the network data is "inside" traffic 807, the network data can be transmitted to the destination host 502A via the service VLAN 810. The network element 606A coupled to the destination host 502A can perform VLAN translation of the network data to VLAN 520 before the data is received at the destination.

While traffic redirection is described herein as using VLANs, any mechanism for traffic redirection may be used, including DirectFlow, VxLAN Bridging, or Generic Routing Encapsulation (GRE) tunnels. Additionally, any physical or virtual service device may be dynamically inserted into the network, including firewall devices, dynamic denial of service attack filters and/or scrubbers, load balancers, or any other software configurable service device.

Exemplary Network Management System

Dynamic Service Insertion can be implemented on top of or in conjunction with a global network management system. In one embodiment, each network element includes a software system, (e.g., network element software system 200 as in FIG. 2) which continually communicates with the global network management system to synchronize state and receive configuration changes or updates. The global management system is not limited to any specific software defined network global management system, but may be any system which coordinates software configurable network elements in a network and/or datacenter environment.

Figure 9:
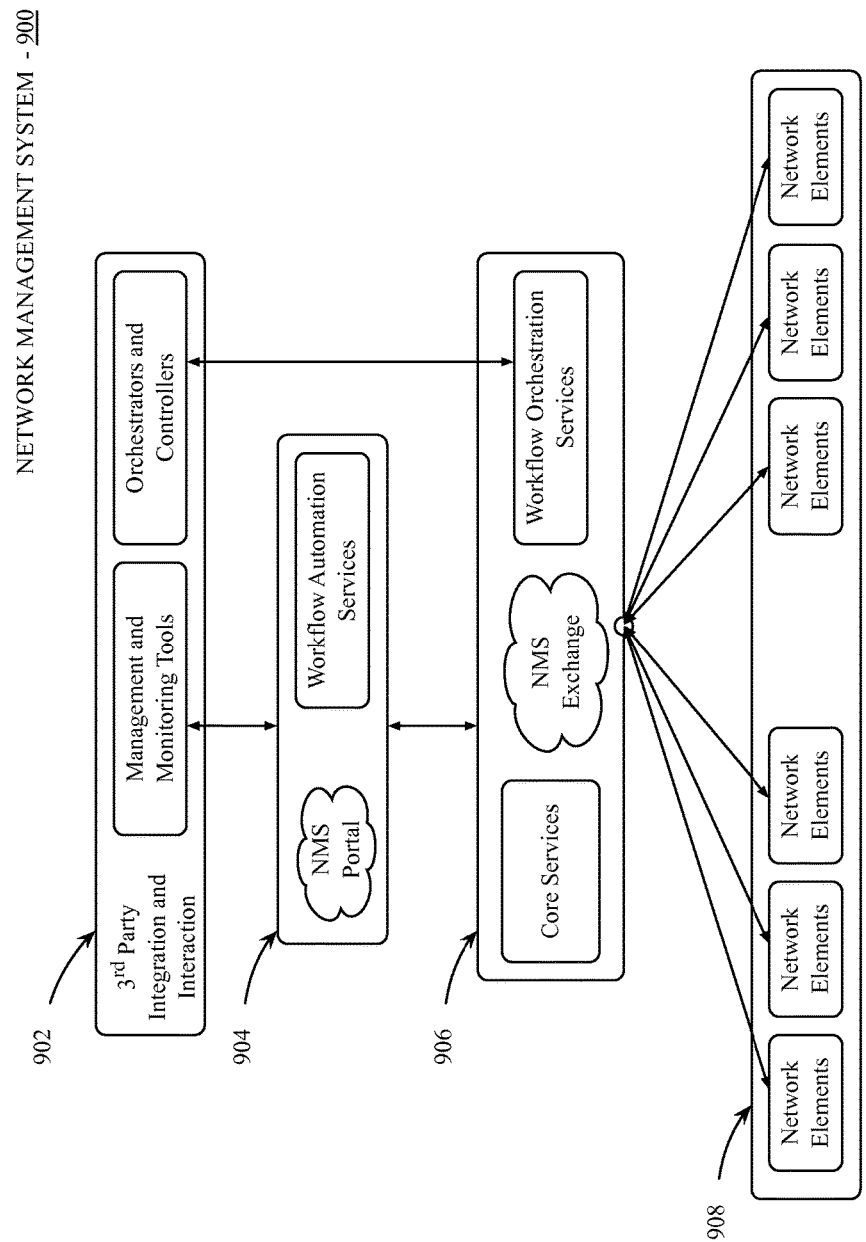
FIG. 9 is a block diagram of an exemplary network management system 900, according to an embodiment.

FIG. 9 is a block diagram of an exemplary network management system 900, according to an embodiment. The network management system 900 may be a variant of the CloudVision® Framework provided by Arista Networks™ of Santa Clara, Calif. In one embodiment the network management system 900 has a multi-layer architecture including a $3^{rd}$ party integration and interaction layer 902, a network management system (NMS) portal layer 904, and an NMS exchange layer 906. The network management system 900 may execute as a VM based virtual server on a network management device. One or more portions of the network management system 900 may also be configured to execute within the control plane of a one or more network elements within the network.

The $3^{rd}$ party integration and interaction layer 902 can include management and monitoring tools, as well as orchestrators and controllers that are provided by $3^{rd}$ party service providers to manage and control a set of network devices. The $3^{rd}$ party service provider tools in the $3^{rd}$ party integration and interaction layer 902 can communicate with an NMS portal layer 904. The NMS portal layer 904 provides a mechanism for the network to achieve cloud scale automation without significant additional development effort. In one embodiment, the NMS portal layer 904 includes workflow automation services that automate network services and provide zero touch provisioning capability for network elements in a network element layer 908, such that network elements may be coupled to the network and centrally provisioned via software.

The NMS portal layer 904 can communicate with an NMS exchange layer 906 that provides core services and workflow orchestration services. The NMS exchange layer 906, in one embodiment, is a network-side multi-function control point that may be configured to execute on a network element in the network element layer 908 or can be deployed as virtual machine executing on a host coupled to a network element. The NMS exchange layer 906 includes a set of workflow orchestration services and core services that provide core management services for the network management system. Once the NMS exchange layer 906 is deployed, network elements can be connected to provide a single point for real-time provisioning, orchestration and integration with multi-vendor (e.g., 3<sup>rd</sup> party) controllers. Additionally, automatic topology discovery can be performed to utilize state and status information received from each network element in the network element layer 908. The received state and status information can be aggregated and used to provide an overview of the functions and operations of each network element in the network.

In one embodiment the core services provided by the network management layer 906 can be performed at least in part by a cloud services module including a DSI Agent (e.g., cloud services module 402 and DSI agent 404 as in FIG. 4) that provides dynamic service insertion for service devices when the service devices are coupled to the network. In one embodiment the DSI agent includes a service policy monitor that leverages the automatic topology discovery enabled by the NMS exchange layer 906 to monitor the policies of service devices coupled to the network and automatically and dynamically implement those policies.

Dynamic Service Insertion Using Service Policy Monitoring

Figure 10:
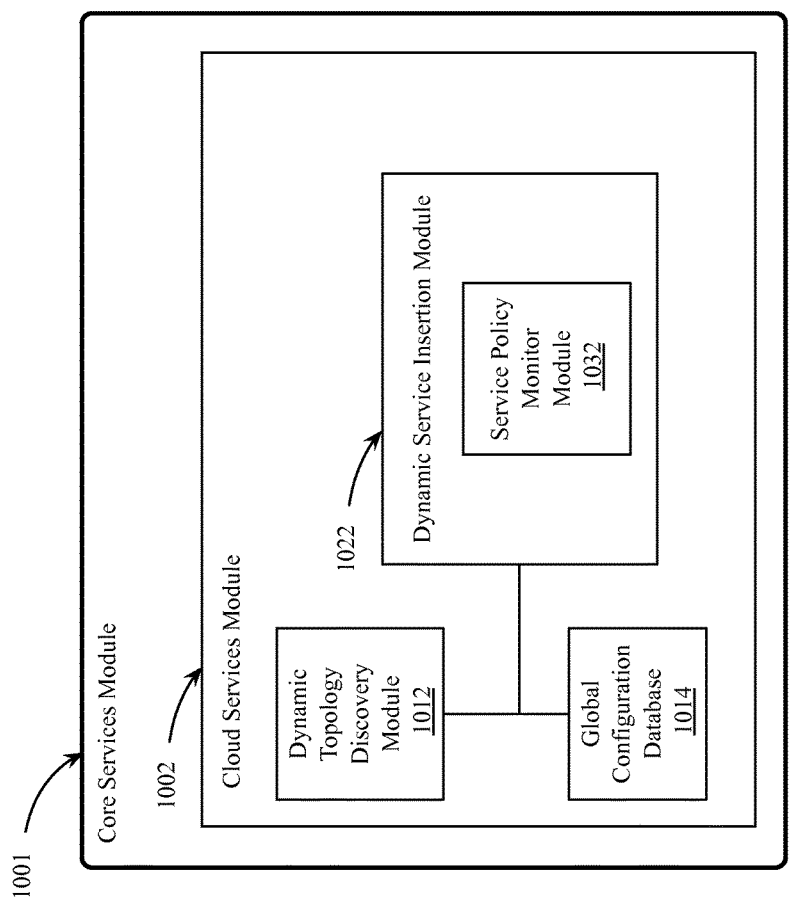
FIG. 10 is a block diagram illustrating logic modules for a dynamic service insertion system, according to an embodiment.

FIG. 10 is a block diagram illustrating logic modules for a dynamic service insertion system 1000, according to an embodiment. In one embodiment the dynamic service insertion system 1000 includes a core services module 1001 that is configured to provide core services, for example, for the NMS exchange layer 906 as in FIG. 9. The core services module can include a cloud services module 1002, which can be used to provide the cloud services 402 of FIG. 4. In one embodiment the cloud services module 1002 includes a dynamic topology discovery module 1012 that is used by a dynamic services insertion (DSI) module 1022 to determine when physical or virtual devices are inserted into the network or moved within the network. The DSI Agent 404 of FIG. 4 is one variant of the DSI module 1022. In one embodiment, the DSI module 1022 includes a service policy monitor (SPM) module 1032, which monitors policies provided by service devices within the network. When the SPM module 1032 detects a new service device policy or a change in a service device policy, the DSI module 1022 can use utilities provided by the cloud services module 1002 to re-configure network elements within the network to implement the policies of the service devices. The polices can be implemented independently of the physical topology of the network, such that the service device can be physically inserted at one location within the network and logically inserted into a different point on the network.

In one embodiment the dynamic topology discovery module 1012 is in communication with other units of the cloud services module 1002, as well as other elements of the core services module 1001. Such communication can allow topology discovery based on a global set of state and status information from each network element. In one embodiment, all, or at least a subset of the active network elements in the network continuously stream state and stats information to the cloud services module 1002, which stores the information in a global configuration database 1014. In addition to state and status information for the network elements, the network elements can use various protocols including link layer discovery protocol (LLDP) to determine the set of devices coupled to each network element. The dynamic topology discovery module 1012 can query a global configuration database 1014 for status information for the various network elements on the network to discover which devices are coupled to which network elements, including the network addresses for each device. Additionally, The dynamic topology discovery module 1012 can also discover device information by observing network data across various network elements. For example, the dynamic topology discovery module 1012 can observe or act as a relay for DHCP traffic and/or ARP/RARP traffic to determine network addresses. This information can be used to supplement the verify information stored in the global configuration database 1014.

Using the dynamic topology discovery module 1012, the DSI module 1022 can be notified whenever a new service device is detected. The DSI module 1022 can then use the SPM module 1032 to query and monitor service policies defined for the service device. In one embodiment the dynamic topology discovery module 1012 also includes the capability to discover and monitor Virtual Machines. The Virtual Machine monitoring capability can be performed independently of device monitoring via network discovery and can include interaction with a dedicated virtual machine monitoring system to track virtual machine movement between host devices.

Figure 11:
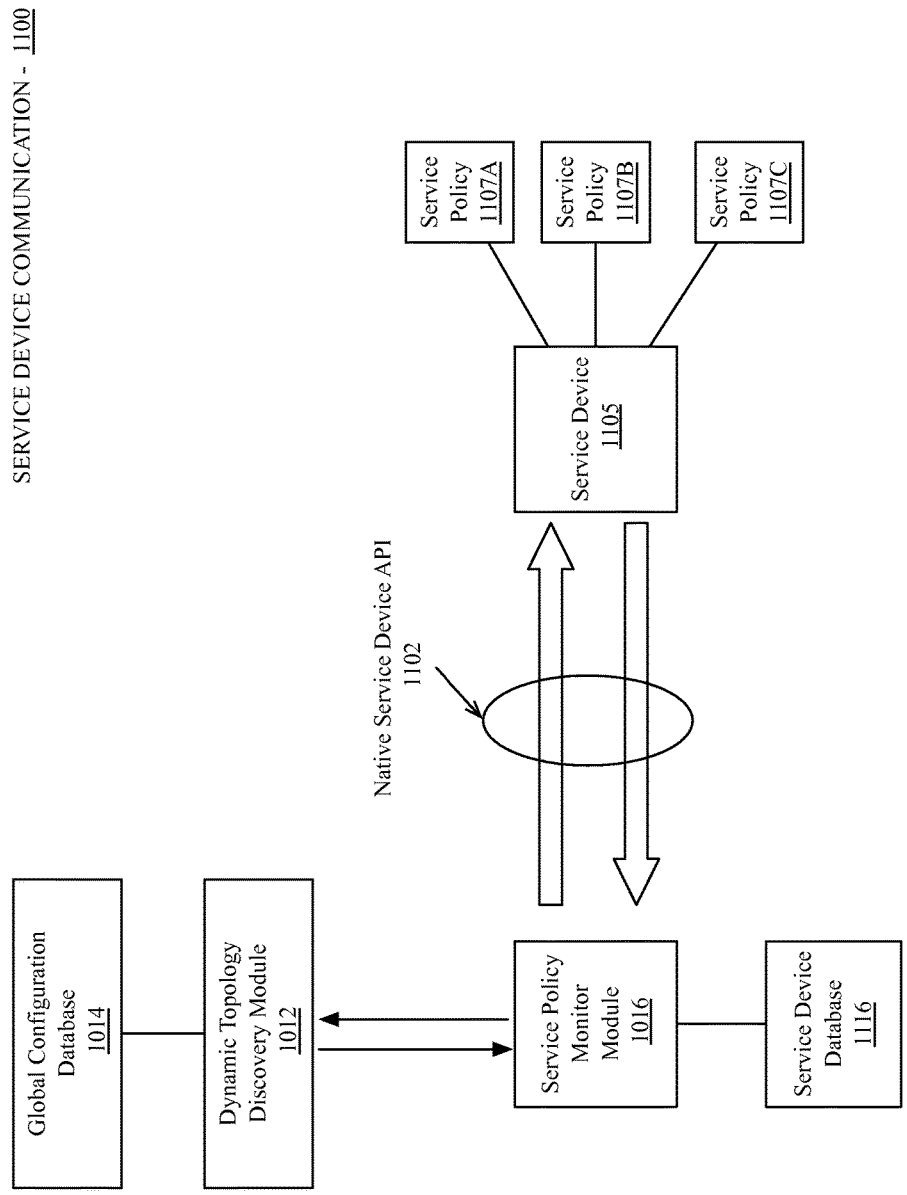
FIG. 11 is a block diagram illustrating a service device communication system, according to an embodiment.

FIG. 11 is a block diagram illustrating a service device communication system 1100, according to an embodiment. The service device communication system 1100 includes the dynamic topology discovery module 1012, global configuration database, and service policy monitor (SPM) module 1016 as shown in FIG. 10. In one embodiment the dynamic topology discovery module 1012, via the global configuration database 1014, can inform the SPM module 1016 that a service device has been coupled to and become active on the network.

In some network configurations the SPM monitor 1016 may be associated with a different device vendor than the service device 1105. Accordingly, the SPM module 1016 may be configured to natively communicate using a different set of APIs than the service device 1105. In one embodiment, the SPM module 1016 is coupled to a service device database 1116 that includes information for the various service devices for which the SPM module 1016 is configured to communicate. Upon being notified of the presence of the service device 1105, the SPM module 1016 may query a service device database 1116 to determine a set of API commands for communication with the service device 1105. In one embodiment the service device database 1116 includes a reference to an API library sub-module containing a set of API commands for communication with the service device in the native service device API 1102. The SPM module 1016 may use the set of commands in the native service device API 1102 to communicate with the service device 1105 in the native software language of the service device 1105, such that the service device 1105 may require little to no modification to interact with the SPM module 1016.

Using the native service device API 1102, the SPM module 1016 can query the service device 1105 to determine the set of service policies 1107A-C that are configured on the device. The SPM module 1016 can also monitor the service device 1105 for updates to any of the service policies 1107A-C, such that any changes in policies can be dynamically implemented on the network. For example if a device administrator for the service device 1105 changes a specific service policy (e.g., service policy 1107A), then the SPM module 1016 can detect the change an implement the policies without any further action by the device administrator for the service device 1105.

Figure 12:
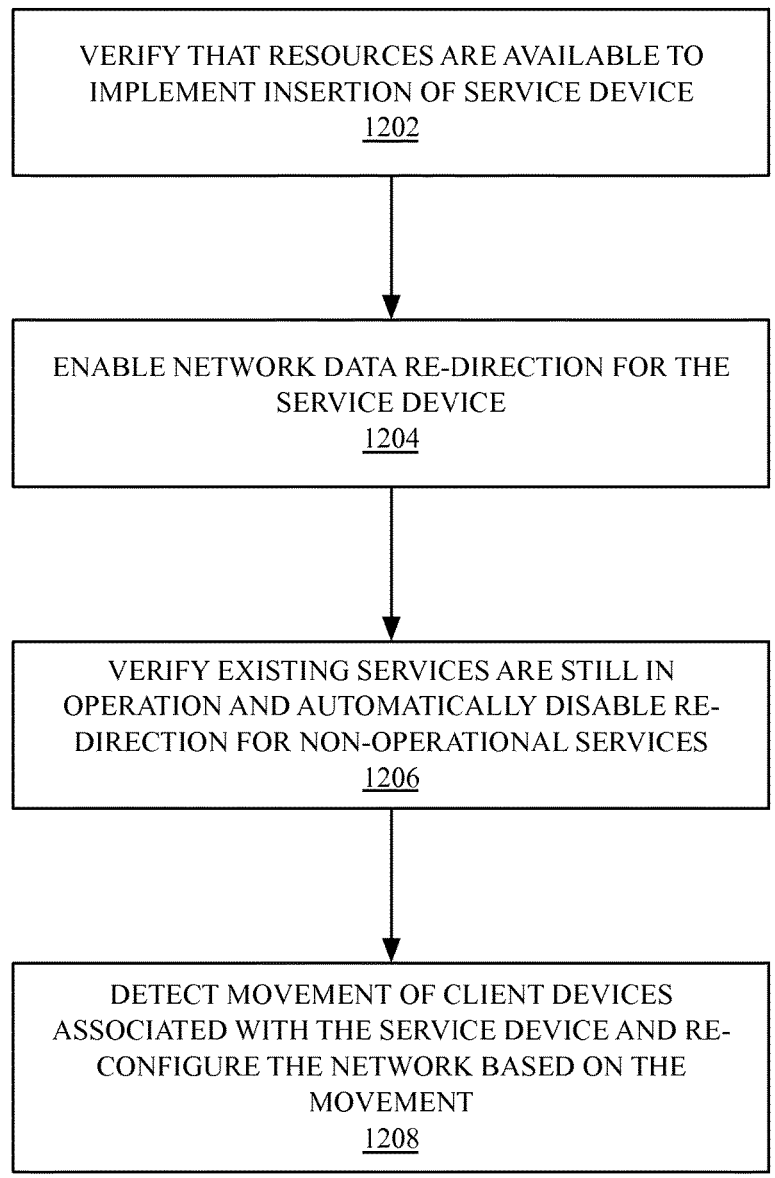
FIG. 12 is a flow diagram of dynamic service insertion logic, according to an embodiment.

FIG. 12 is a flow diagram of dynamic service insertion logic 1200, according to an embodiment. In one embodiment, the DSI module 1022 of FIG. 10 and/or the DSI agent 404 of FIG. 4 performs the dynamic service insertion logic

1200. The dynamic service insertion logic 1200 includes can verify the availability of the resources (e.g., VLANs, VNIs, ACLs/DirectFlow) that will be used to perform dynamic service insertion for a service device, as shown at block 1202. If there are any issues with any required software and/or hardware resources, a log entry can be made to debug the issue. As shown at block 1204, the dynamic service insertion logic 1200 can enable network data re-direction for new services configured for the network. Additionally, as shown at block 1206, the dynamic service insertion logic 1200 can additionally verify that any existing, previously configured services are still in operation and adjust the network configuration to disable re-direction for non-operational services. If any of those services are no longer in operation, the dynamic service insertion logic 1200 can log the failure of the service and restart the service, which can include re-configuring one or more network elements within the network.

Additionally, the dynamic service insertion logic 1200 can detect movement of client devices of the service device between locations within the network. In response to the movement, the dynamic service insertion logic 1200 can re-configure the network based on the movement, as shown at block 1208, such that the client device receives service from the network service device at the new location within the network. In one embodiment this re-configuration includes disabling re-direction for the client device on the previous network element to which the client device was attached and enabling re-direction for the client device on the network element to which the client device is currently attached. Device movement can include service devices or host/client devices that are impacted by service device policies.

Any of the devices described (e.g., service devices, hosts, clients, etc.) may be a virtual device, such as a virtual machine. Multiple virtual machines executing on a host can be configured to work with a dynamically inserted service device. Additionally, virtual service devices can be dynamically inserted into the network. In one embodiment, should an agent or module executing the dynamic service insertion logic 1200 were to restart during operation, the agent/module can gracefully merge previously configured or discovered state with an existing operating state of the system.

Figure 13:
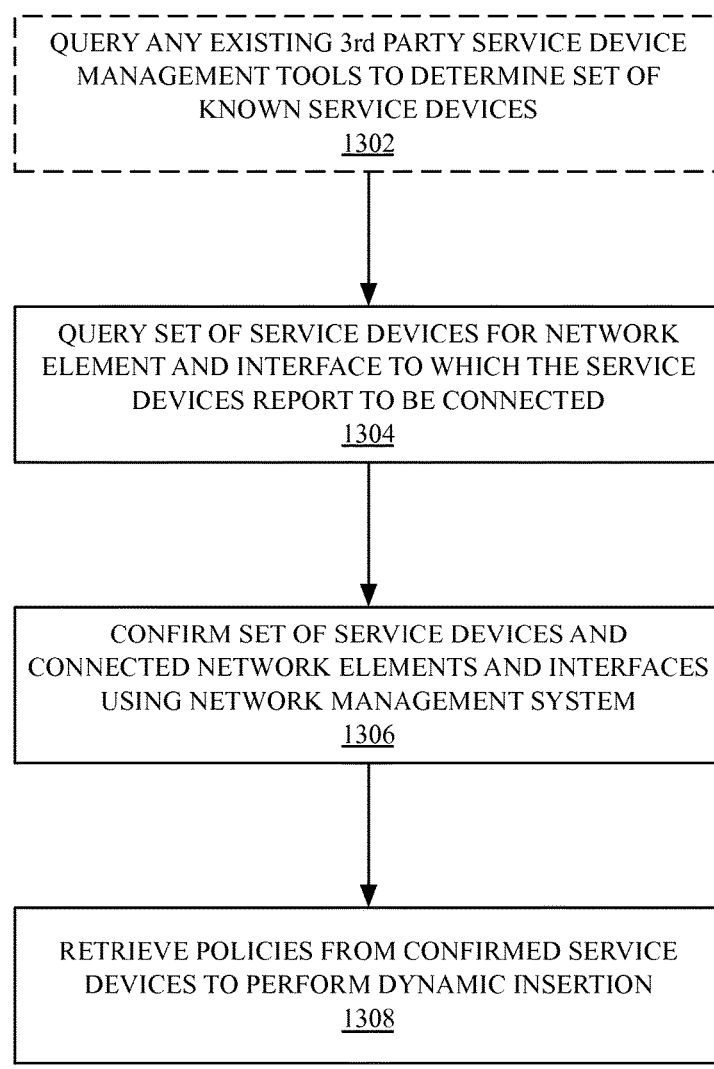
FIG. 13 is a flow diagram for service device verification logic, according to an embodiment.

FIG. 13 is a flow diagram for service device verification logic 1300, according to an embodiment. In one embodiment each service device configuration is verified by the DSI agent 404 as in FIG. 4 and/or the DSI module 1022 as in FIG. 10 using the network management system 900 shown in FIG. 9, which has network wide visibility into each network element and each device coupled to the network elements. The service device verification logic 1300 can be executed for all service device types or for a subset of service device types, such as security service devices (e.g., firewalls, DDOS scrubbers, etc.).

For service devices from particular vendors, the service device vendor may provide $3^{rd}$ party service device management tools that have visibility into the presence and/or configuration of service devices from the service device vendor. Where such service device management tools exist, the service device verification logic 1300 can be configured to query any existing $3^{rd}$ party service device managers to determine a set of known service devices, as shown at block 1302. Such operation is not mandatory however, and where service devices do not have an overall management solution provided by the vendor, a set of service devices coupled to the network can be configured manually or determined automatically via the use of data advertised via LLDP.

At block 1304, the service device verification logic 1300 can query the set of service devices for the network element and network element interface to which the service devices report to be connected, as well as any other network configuration data that may be queried from the set of service devices. The set of service devices can be a known set of service devices provided by a service device management tool at block 1302, but can also include a set of detected service devices via network device detection mechanisms such as LLDP.

At block 1306 the service device verification logic 1300 can confirm the set of service devices and the set of network elements and network element interfaces to which the service devices are connected using the network management system 900 of FIG. 9. The network management system maintains a global configuration database (e.g., global configuration database 1014 as in FIG. 10) that includes data for each network element and connected device within the network. The data retrieved from the set of service devices can be confirmed with the network management system. If the information reported by the service device differs from the information reported by the network management system, the network service device may be misconfigured, may be erroneously misreporting data, or may have been fraudulently or maliciously inserted into the network and is attempting to spoof or supersede and existing or legitimate service device. The service device verification logic 1300 can then retrieve policies from confirmed service devices to perform dynamic service insertion, as shown at block 1308, if the information reported by the service device is consistent with the information from the network management system. It will be understood that, in some embodiments, the network management system (e.g., network management system 900 of FIG. 9) may be executing within a VM that is executing on a network management device that is configured to manage at least a portion of the network.

Figure 14:
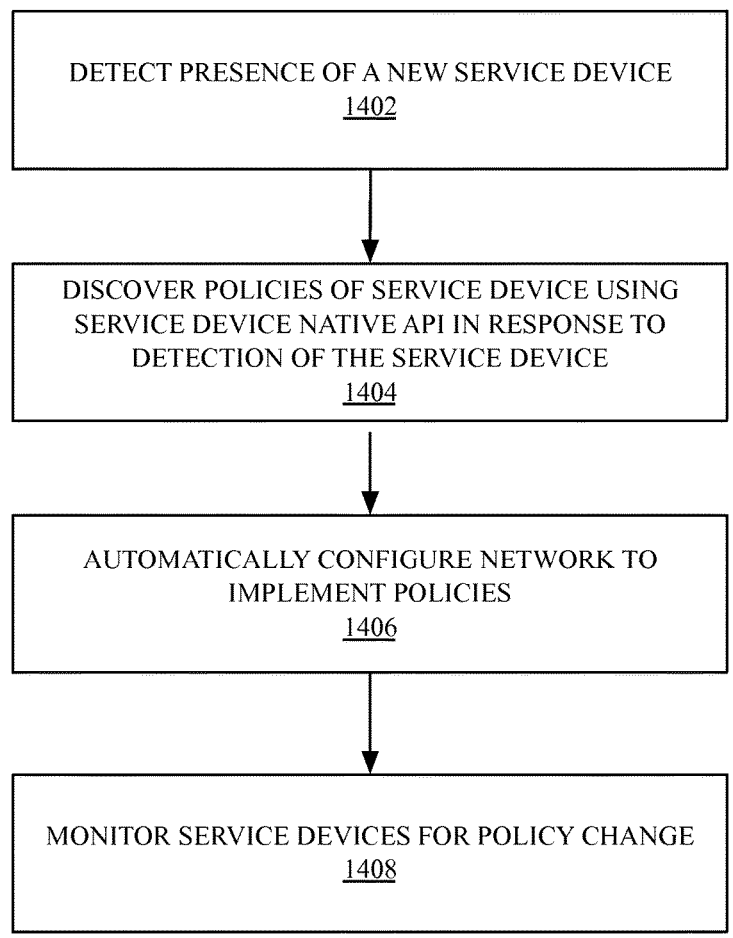
FIG. 14 is a flow diagram for service device policy logic, according to an embodiment.

FIG. 14 is a flow diagram for service device policy logic 1400, according to an embodiment. The service device policy logic 1400 can be implemented at least in part by the DSI agent 404 as in FIG. 4 and/or the DSI module 1022 and SPM module 1032 as in FIG. 10. In some embodiments the dynamic topology discovery module 1012 as in FIG. 10 may provide assistance for certain operations. In one embodiment, modules of the NMS exchange layer 906 as in FIG. 9 assist in the propagation of network configuration changes (e.g., to the network elements of the network element layer 908) based on service device policies.

In one embodiment the service device policy logic 1400 operates on all policies defined on a service device. In one embodiment the service device policy logic 1400 operates on a subset of policies. The subset of policies can be defined by inclusion of a specific string or substring in the policy description text field or policy name. In one embodiment a pre-defined tag can be added to a policy to indicate that the policy is to be automatically processed by the service device policy logic 1400.

In one embodiment, the service device policy logic 1400 begins at block 1402 with an operation to detect the presence of a new service device. In one embodiment, a dynamic topology discovery module coupled to a global configuration database can assist in the detection of the presence of the new service device. In response to the detection of a service device, the service device policy discovery logic 1400 can perform additional operations including to discover the policies of the service device using the service device native API, as shown at block 1404. Once the policies are discovered via communication with the service device at block 1404, the service device policy logic 1400 can perform a set of operations to automatically configure the network to implement the discovered policies. The specific method and mechanisms used to automatically configure the network at block 1406 can vary among embodiments. In one embodiment, modules of the NMS exchange layer 906 as in FIG. 9 assist in the propagation of network configuration changes to the network elements of the network. Such propagation can include pushing configuration changes to each network element to enable the network elements to re-direct and/or modify the flow of network data across the network, such that network data to or from client devices identified by the policies of the service device is automatically re-directed to the service device.

In one embodiment the VLAN or VxLAN configuration for network elements within the network may be modified to perform the network data re-direction. For example, in one embodiment, and as shown in FIGS. 7-8, a service VLAN can be configured for the service device. With reference to FIG. 8, a tunnel can be configured having endpoints (e.g., virtual tunnel endpoints) at the leaf network element 606A coupled to the host devices specified by the service device policies. The tunnel endpoints can direct traffic to a service VLAN 810 associated with the service device 805. Embodiments are not limited to any specific implementation or protocol and any mechanism of dynamically re-directing traffic including VLAN, VxLAN, GRE tunnels, DirectFlow, Openflow, or other protocols and/or specifications may be used to implement DSI within a network.

Once the network is configured the service device policy logic 1400 can be configured to monitor the detected service device, as shown at block 1408. Monitoring the detected service device can enable the service device policy logic 1400 to response to any changes in policies that may be implemented by service device administrators or that may be automatically implemented by a service device based on automated control logic.

Figure 15:
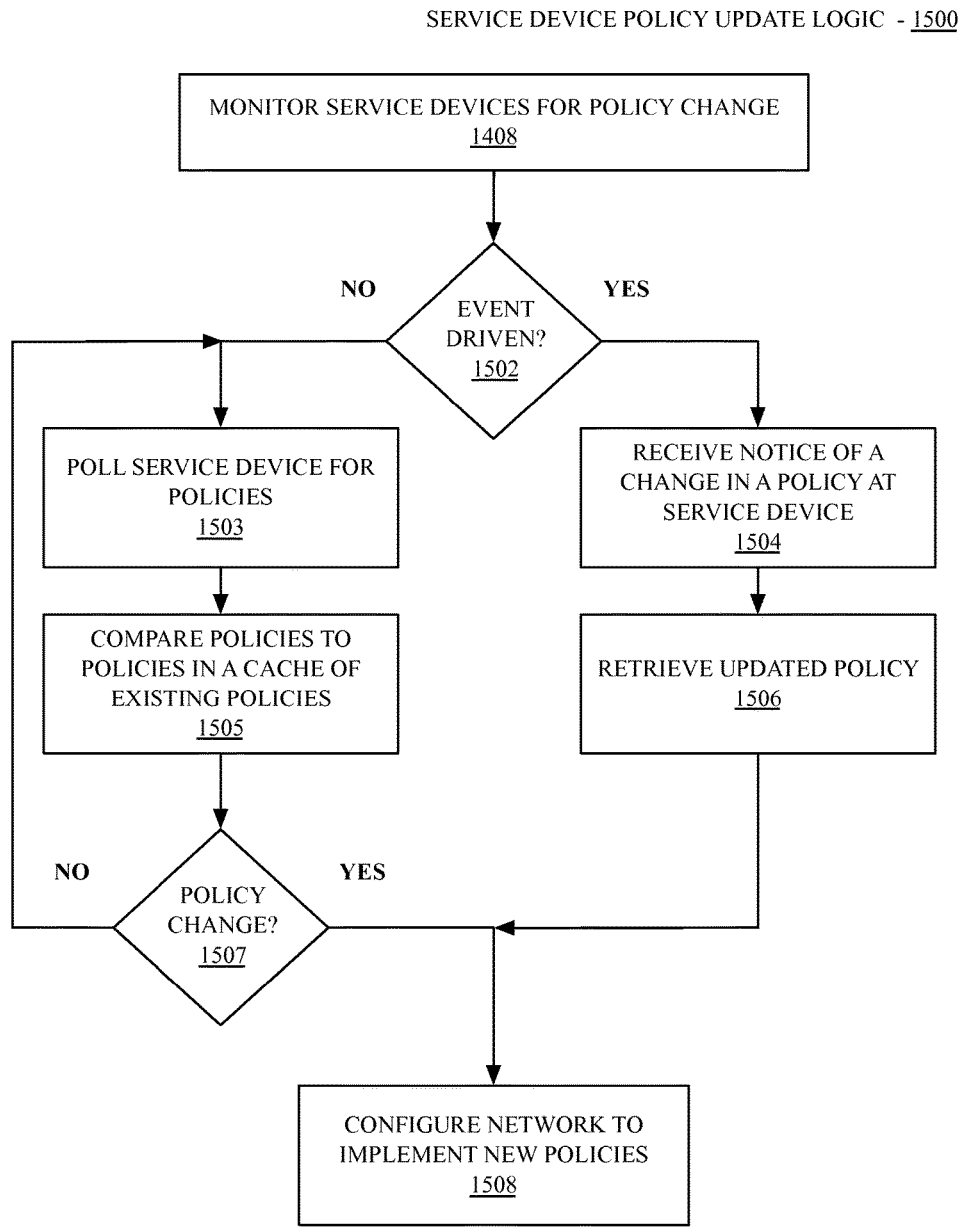
FIG. 15 is a flow diagram for service device policy update logic, according to an embodiment.

FIG. 15 is a flow diagram for service device policy update logic 1500, according to an embodiment. In one embodiment the SPM module 1032 shown in FIG. 10 performs at least a portion of the service device policy update logic 1500. Operations for the service device policy update logic 1500 can begin at block 1408 in which the service device policy update logic 1500 monitors the service devices for policy change.

In one embodiment the service device policy update logic 1500 can operate in event driven mode or in polling mode. In polling mode the service device policy update logic 1500 polls each service device at a configurable interval. In event driven mode the service device policy update logic 1500 receives specific notification of changes in specific policies. Event driven mode can be enabled by explicitly subscribing to a set of policies for a service device. The service device policy update logic 1500 can be notified of any changes in subscribed policies. However, not all service devices may support subscription.

Determination of event or poll driver operation can be determined as shown at block 1502. If in event driven operation (e.g., policy subscription is enabled) then the service device policy update logic 1500 can receive a notice of a change in a policy at the service device at block 1504. The service device policy update logic 1500 can then retrieve the updated policy as shown at block 1506. Alternatively the new policy, or the specific changes for the new policy can be pushed to the service device policy update logic 1500. In each case, the service device policy update logic 1500 can configure the network to implement the new policies at block 1508.

Where the operation is not event driven, the service device policy update logic 1500 can periodically poll a service device in a set of active service devices for policies at block 1503. The current policies on the service device can be retrieved and the service device policy update logic 1500 can compare the policies to policies in a cache of existing policies at block 1505. The policies in the cache of existing policies may be policies that were previously retrieved from the service device or from a set of service devices on the network. The service device policy update logic 1500 can determine if any of the policies have changed at block 1507 based on the comparison at block 1505. If no policy changes have occurred the service device policy update logic 1500 can return to block 1503 and poll the service devices for policies based on the configured polling interval. If a policy change has occurred at block 1507 the service device policy update logic 1500 can configure the network to implement the new policies at block 1508. In one embodiment a DSI module or DSI agent as described herein can perform the operations to configure the network to implement the new policies that are shown at block 1508.

Figure 16:
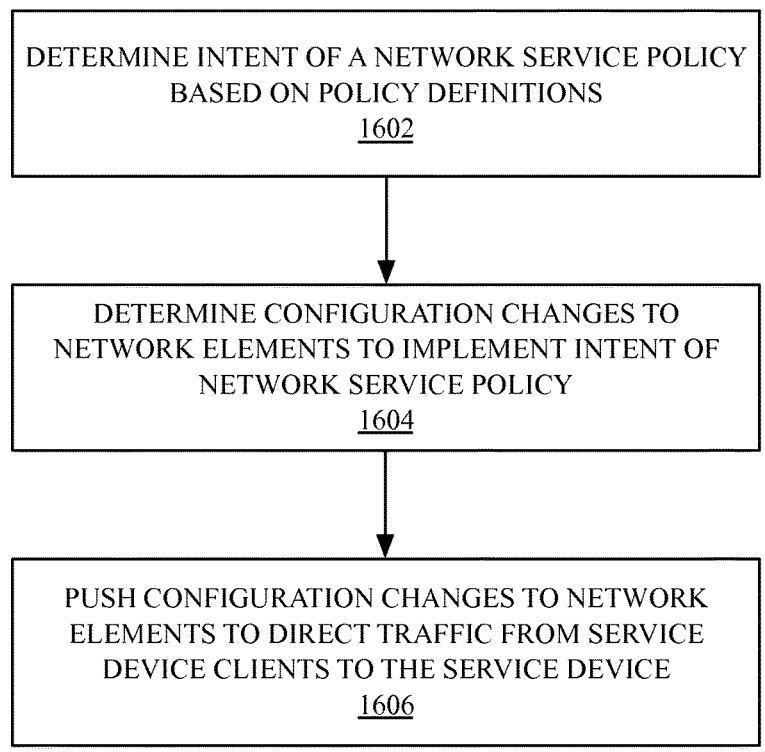
FIG. 16 is a flow diagram for network configuration logic, according to an embodiment.

FIG. 16 is a flow diagram for network configuration logic 1600, according to an embodiment. In one embodiment the network configuration logic 1600 is performed by or on behalf of the DSI agent 404 as in FIG. 4 and/or the DSI module 1022 as in FIG. 10. The network configuration logic 1600 can additionally leverage the network management system 900 shown in FIG. 9 to push configuration changes out to network elements that are impacted by the service device policies.

In one embodiment the network configuration logic 1600 can determine the intent of a network service policy based on policy definitions, as shown at block 1602. The policy definitions can include one or more network services to provide to clients of the network service device and/or one or more network service zones to which these services will (or will not) be provided. The network service zones can be defined by a set of hosts or address ranges that define a set of service clients (e.g., host devices, workstations, VMs, etc.) of the network service device, as well as the status, relationship, or designation of the service zones, the specifics of which can very between differing types of network service devices.

Determining the intent of a network service policy can include determining the explicit details specified by the service device policies as well as determining the overall intent (e.g., network traffic filtering, web caching, etc.) of the service policy for the service provided by the service device. Determining the intent of the service policy, for some service devices, can include deriving any implicit policies that may be inferred from explicit policies but that may not be explicitly listed in the service policy. For example, a firewall service device can include a policy defining explicit trust zones based on an address range or address prefix. The network configuration logic 1600 can analyze the explicit trust zones defined by the policy and derive a set of network configuration rules implied by the policies.

At block 1604, the network configuration logic 1600 can determine the configuration changes the network elements coupled to network hosts, clients, and/or VMs that are affected by the service device policies that will be required to implement the intent of the network service policy. Once those changes are determined, the network configuration logic 1600 can push configuration changes to the various network elements and cause the network element to direct network traffic from service device clients to the service device at block 1606. The nature of the configuration changes to the network elements can vary based on the service device and the specific service device policies that are implemented.

Figure 17:
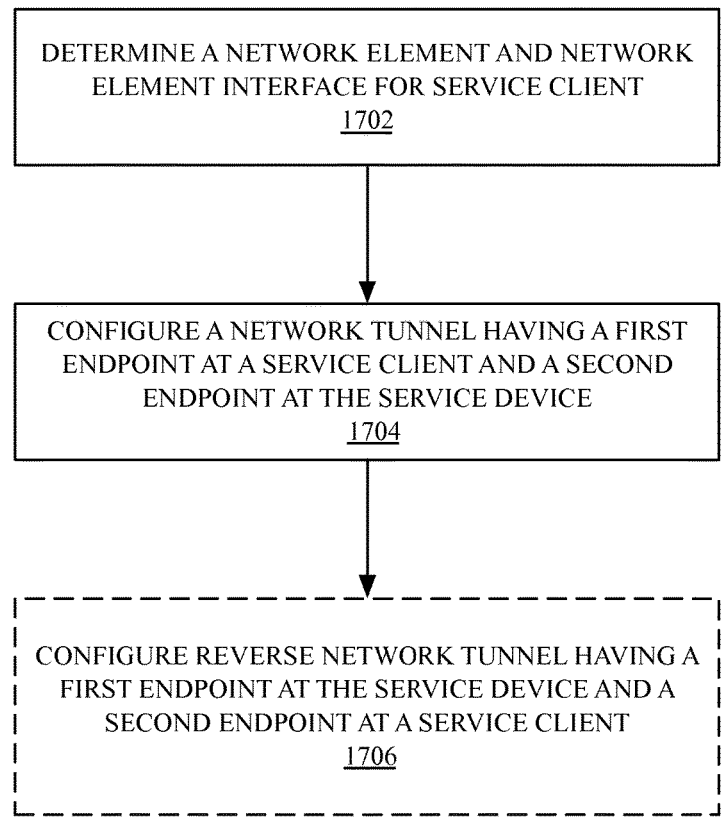
FIG. 17 is a flow diagram of an exemplary network configuration process.

FIG. 17 is a flow diagram of an exemplary network configuration process 1700. The exemplary network configuration process 1700 can be performed by the network configuration logic 1700. However, the specific details are exemplary and any manner of traffic flow re-direction can be used. Additionally, the details can vary based on the specific service device policies being configured.

During the exemplary network configuration process 1700, network configuration logic (e.g., network configuration logic 1700 as in FIG. 17) can determine a network element and network element interface for a service client, as shown at block 1702. The network element and network element interface can be determined based on a set of policies defined for the service device. For example, where a policy defines a layer-3 address range (e.g., IP Address range and/or TCP port range), a set of service clients can be determined that fall in the specified address range. The network elements that are attached to the set of clients can be determined as well as the specific ports by which the service clients are attached to the network element.

At block 1704 the exemplary network configuration process 1700 includes to configure a network tunnel having a first endpoint at the service client and a second endpoint at the service device. The specifics of the tunnel can vary, as the tunnel can be a GRE tunnel providing a virtual point-to-point link, a VLAN/VxLAN tunnel through VTEPs at specific interfaces of the network element, DirectFlow traffic steering, or any other network tunneling mechanism. This tunnel can be defined, for example, between service clients that are "inside" of the network zone to which the service device provides service.

At block 1706 the exemplary network configuration process 1700 includes configuring a reverse network tunnel having a first endpoint at the service device and a second endpoint at a service client. Configuration of the reverse tunnel may not be required in all scenarios. For certain tunnels, (e.g., VLAN based tunnels) a reverse tunnel may not be required. For DirectFlow traffic steering, an explicit reverse tunnel or reverse path may be defined to steer traffic from service clients that are "outside" of the network zone that will traverse the service device into the proper service VLAN to reach the service device. DirectFlow traffic steering can be configured by defining an intercept specification that defines a network element and a set of matching criteria that is used to identify network traffic flowing through the network element. Network data that matches the match criteria can be intercepted and mirrored or re-directed as needed to implement traffic re-direction into and out of the dynamically configured service device.

In one embodiment, broadcast, unknown, and multicast (BUM) traffic presents a special case for dynamic service insertion when some service devices are inserted. For example, for a host to send broadcast network traffic to other hosts within the same VLAN when a service device has been inserted between hosts within the same VLAN, some degree of traffic replication may be required to emulate the effect of broadcast or multicast network traffic within a VLAN.

Exemplary Firewall Device Configuration Logic

Figure 18:
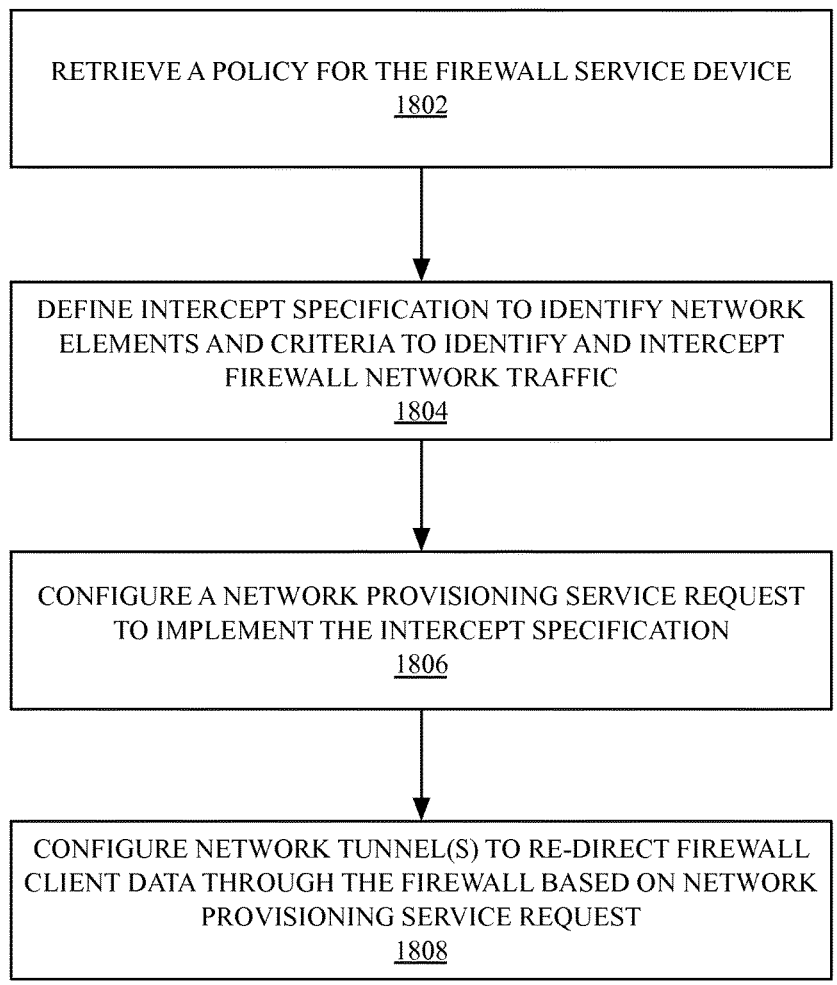
FIG. 18 is a flow diagram of exemplary firewall configuration logic.

FIG. 18 is a flow diagram of exemplary firewall configuration logic 1800. The logic is exemplary of an embodiment but not limiting as to all embodiments, as the specific implementation details can vary without violating the spirit of the invention. The logic operations described below can be implemented at least in part by the DSI agent 404 as in FIG. 4 and/or the DSI module 1022 and SPM module 1032 as in FIG. 10.

In one embodiment, the SPM module can implement a portion of the firewall configuration logic 1800. The SPM module can include an API library sub-module and a service request interface to the network configuration portion of the DSI module. The SPM module can use the API library sub-module to retrieve a policy for the firewall service device at block 1802 using the native API of the firewall. The SPM module can also include a policy poller module to subscribe and/or periodically poll for updated firewall policies to read current policy information on each firewall and check for configuration changes. The SPM module can gather information from the firewall device including but not limited to device policies; security zones; static and dynamic address groups; interface, sub-interface, and VLAN details; virtual-wire and layer-2 network object definitions; and LLDP neighbors.

A policy can be retrieved, for example, when a new firewall device is coupled to the network. The policy can also be retrieved in response to the provisioning of a new VM based firewall by a $3^{rd}$ party firewall virtualization manager. Some policy configuration changes may signal the need to dynamically insert or remove firewall services via network provisioning of one or more network elements. In one embodiment, at block 1804 the SPM module can define an intercept specification to identify network elements and criteria to use in the identification and interception of firewall network traffic. The intercept specification can include DirectFlow match criteria, VLAN information, or other data that can be used to identify network data from firewall clients that should be directed to through the firewall by network elements within the network. Exemplary intercept specification criteria includes target network element address or DNS name, network element ingress interface(s), network element ingress VLAN, source and/or destination layer-2 and/or layer-3 addresses, as well as source and/or destination layer 4 ports.

Based on the intercept specification defined at block 1804, the firewall configuration logic 1800 can configure a network provisioning service request to implement the intercept specification, as shown at block 1806. The network provisioning service request to implement the intercept specification can be submitted to a service request interface of the SPM module that interfaces with the network configuration portion of the DSI module.

As shown at block 1808, the firewall configuration logic 1800 can configure one or more network tunnels to re-direct firewall client data through the firewall based on the network provisioning service request. Once the network tunnels are configured, the network traffic that satisfies the match criteria of the intercept specification can be injected into a network tunnel leading to the inserted service device. Various tunneling methods can be used, including VxLAN tunneling.

In one embodiment the configuration on the firewall device can be adjusted based on the retrieved firewall policy using the native firewall device API. In one embodiment the dynamic service insertion can be performed with only read-only access to the firewall device configuration and can configure the network to implement the firewall device policies without adjusting the configuration of the firewall device. Various dynamically inserted firewall configurations are possible, including virtual wire deployments or network layer-2 deployments. In a virtual wire deployment the firewall is installed transparently on a network segment by binding two firewall device interfaces. Using a virtual wire configuration, the firewall device can be inserted into a network environment without reconfiguring the adjacent devices. In a network layer-2 deployment the firewall can provide network data forwarding functionality between two or more interfaces, allowing the firewall device to perform some degree of network element functionality, including VLAN based switching.

Firewall device policies can define security zones using a set of source and destination addresses. One embodiment supports addresses defined as canonical IPv4 or IPv6 address, a string identifying an IP subnet (e.g. 192.168.80.0/24) or an IP address range (e.g. 10.0.0.1-10.0.0.99). In one embodiment, addresses may be included in firewall policies as an individual address, a static address group, or a dynamic address group. The dynamic address group membership can be based on a logical expression of tags that are associated with a host IP address.

While specific logic is described for a firewall service device, DSI can be implemented using a variety of service devices and is not limited to firewall devices. For example, a DDOS scrubber can be dynamically inserted into a network and configured on-demand to forward network traffic suspected of being associated with a distributed denial of service attack through the DDOS scrubber. The redirection can be performed using VLAN/VxLAN/GRE tunneling and/or DirectFlow as described with respect to firewall service devices. Additionally, web-cache devices, web-filter devices, or other network data caching and/or content filtering devices can be dynamically inserted into a network and automatically configured to match and re-direct specific types of network traffic (e.g., hypertext transfer protocol (HTTP) traffic) through the network data caching or filtering device. For example, DirectFlow matching can be used to identify and intercept or mirror of network data having specific characteristics. Additionally, where DirectFlow is described, OpenFlow may also be used.

Automated Network Element Configuration

Figure 19:
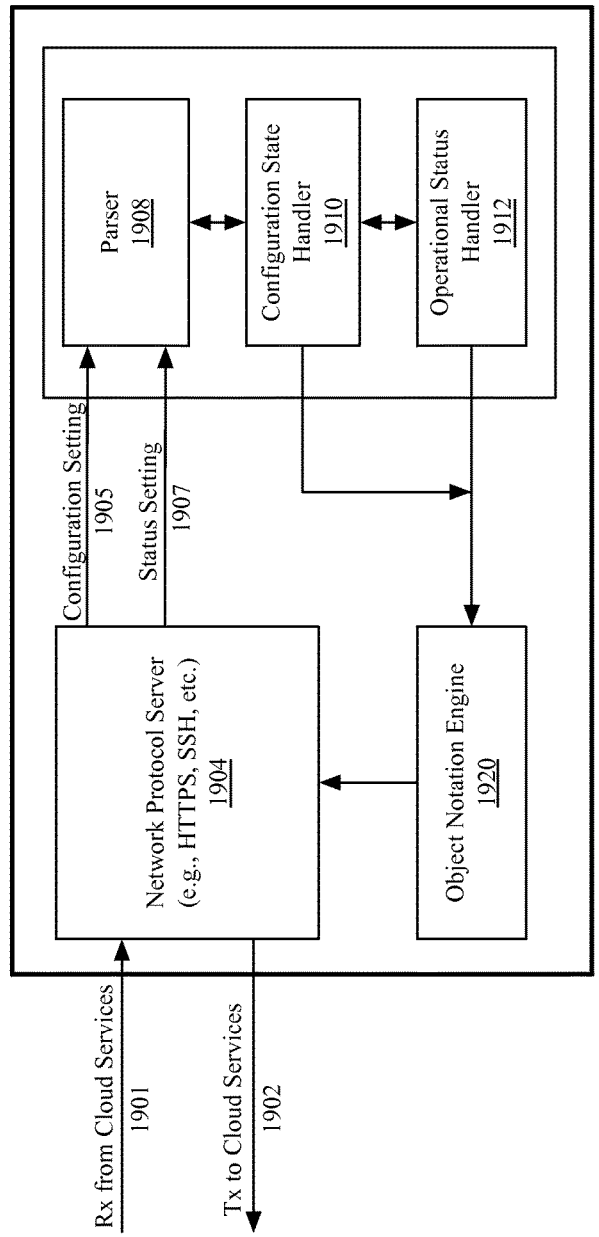
FIG. 19 illustrates elements of an automated network element configuration system, according to an embodiment.

FIG. 19 illustrates elements of an automated network element configuration system 1900, according to an embodiment. The automated network element configuration system 1900 can be included within a network element to transmit network element state and receive network element configuration data to configure the network element to implement dynamic service insertion operations. In one embodiment the automated network element configuration system 1900 is implemented at least in part by the state/status agents 408A-N in conjunction with the DSI agent 404 and cloud services 402 of FIG. 4.

In one embodiment the automated network element configuration system 1900 is configured to receive 1901 configuration data from the cloud services module (illustrated as Rx from Cloud Services) as well as transmit 1902 data to the cloud services module (illustrated as Tx to Cloud services). Transmitting to and receiving from the cloud services module can be performed by a network protocol server 1904, such as an HTTPS server or an SSH server, although any network protocol server capable of receiving and transmitting network data may be used. In one embodiment, the Extensible Messaging and Presence Protocol (XMPP) may be used. The automated network element configuration system 1900 can additionally include a parser 1908, a configuration state handler 1910, and an operational status handler 1912.

The network protocol server 1904 can receive formatted configuration and state data from an object notation engine 1920, which formats updates into an object notation or object tree representation. The network protocol server 1904 can also transmit incoming configuration settings 1905 and status settings 1907 to the parser 1908, which can parse the incoming messages to determine whether an incoming message is intended to update the configuration state or the operational status of the network element. Where the incoming messages are received in an object notation format, the parser can include logic similar to the object notation engine 1920. The parser 1908 can supply configuration state updates to the configuration state handler 1910 and operational status updates to the operational status handler 1912.

Each of the configuration state handler 1910 and the operational status handler 1912 can receive or retrieve data from various data sources within the network element, such as, but not limited to a central system database (e.g., Sysdb), system logs, and agent logs, forwarding tables and other shared memory tables, and/or hardware specific state, such as hardware counters within network interfaces. In one embodiment, the configuration state handler 1910 and operational status handler 1912 can retrieve and report kernel and/or hardware abstraction layer data. The received or retrieved state and status data can be supplied to the object notation engine 1920 for formatting before being transmitted to one or more collectors via the network protocol server 1904. In one embodiment, the automated network element configuration system 1900 is configured, upon startup, to gracefully merge previously configured or discovered state with an existing operating state of the system.

Exemplary Data Processing System and Modular Network Element

Figure 20:
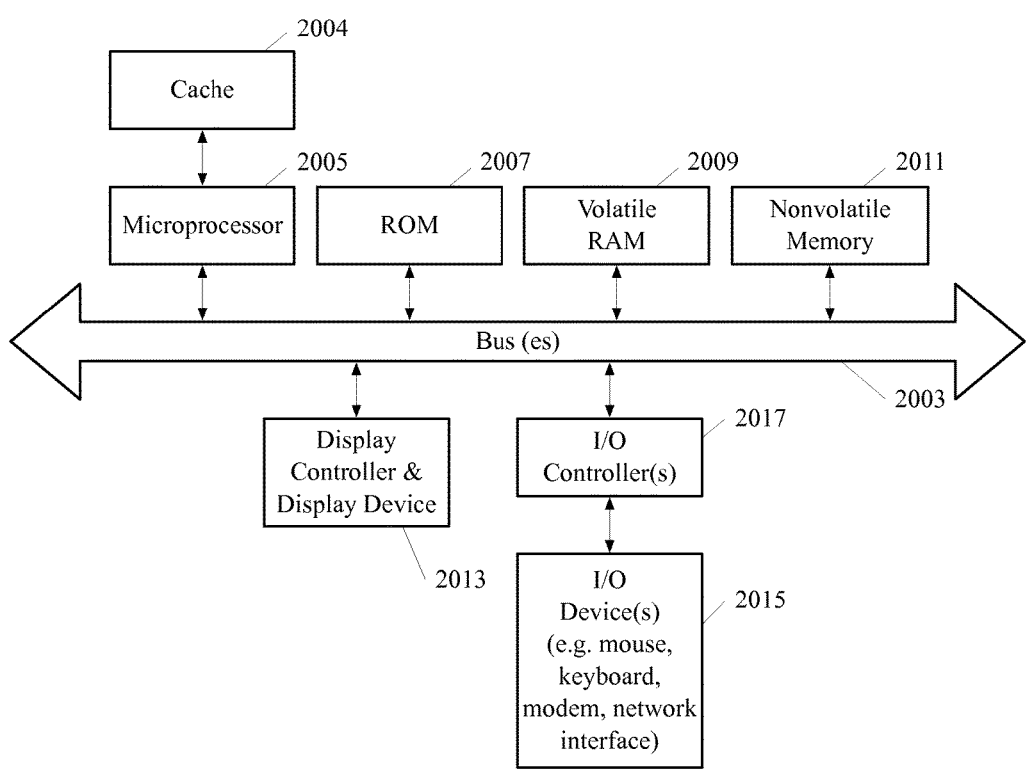
FIG. 20 shows one example of a data processing system, which may be used with one embodiment of the present invention.

FIG. 20 shows one example of a data processing system 2000, which may be used with one embodiment of the present invention. For example, the data processing system 2000 may be implemented including one or more of network element 100 as in FIG. 1, or any other network element described herein. In one embodiment, the data processing system 2000 is used within the control plane of a network element described herein. Note that while FIG. 20 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 2000 includes one or more bus(es) 2003 which couple to one or more microprocessor(s) 2005, ROM (Read Only Memory) 2007, volatile RAM 2009 and a non-volatile memory 2011. In one embodiment, the one or more microprocessor(s) 2005 couple to a cache 2004, which can include one or more sets of instruction and/or data caches. The bus(es) 2003 may include one or more buses connected to each other through various bridges, controllers and/or adapters as is well known in the art.

The microprocessor(s) 2005 may retrieve the instructions from the memories 2007, 2009, 2011 and execute the instructions to perform operations described above. Instructions and/or associated data retrieved from the memories 2007, 2009, 2011 may be stored in the cache 2004. The bus(es) 2003 interconnect system components with each other, and to a display controller and display device 2013, and to peripheral devices such as input/output (I/O) devices, which may be mice, keyboards, modems, network interfaces, printers and other devices well known in the art. Typically, the input/output devices 2015 are coupled to the system via input/output controller(s) 2017. The volatile RAM (Random Access Memory) 2009 is typically implemented as dynamic RAM (DRAM), which requires power continually in order to refresh or maintain the data in the memory, but may also include static ram (SRAM), which does not require a periodic refresh.

In one embodiment, the non-volatile memory 2011 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 2011 will also be a random access memory although this is not required. While FIG. 20 shows that the non-volatile memory 2011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 21:
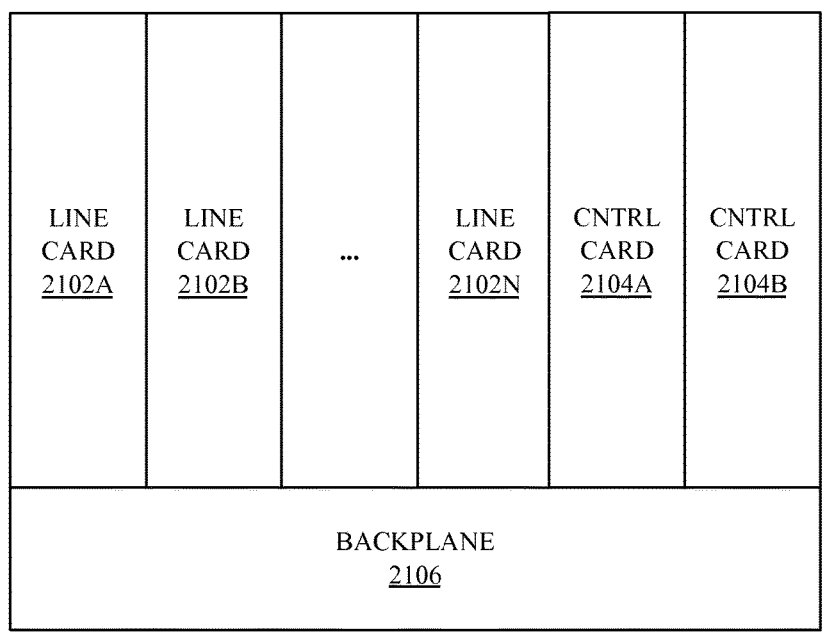
FIG. 21 is a block diagram of an additional embodiment of an exemplary modular network element as described herein.

FIG. 21 is a block diagram of an additional embodiment of an exemplary modular network element 2100 as described herein. In one embodiment, the network element has a modular and expandable configuration that allows the addition or removal of resources configured as line cards 2102A-N, or controller cards 2104A-B coupled to a backplane 2106. In one embodiment, the controller cards 2104A-B control the processing of the traffic by the line cards 2102A-N, which can each include one or more network data forwarding devices such as interfaces 106A-C as in FIG. 1, although the precise nature of the forwarding devices is not limited as such. In one embodiment, the line cards 2102A-N process and forward traffic according to the network policies received from controller cards the 2104A-B. In one embodiment, one or more of the line cards 2102A-N can monitor and report internal performance data, such as latency data for all or selected units of network data traversing the network element. In one embodiment, the controller cards 2104A-B can also be configured to perform all or a sub-set of functions provided by the line cards 2102A-N. It should be understood that the architecture of the network element 2100 illustrated in FIG. 21 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for according to embodiments and examples described herein. Additionally various components described herein can be a means for performing the operations or functions described in accordance with an embodiment.

One embodiment provides for a network system comprising a set of network elements to interconnect a set of host devices, the set of network elements having a physical topology defined by the physical links between network elements in the set of network elements, and a network management device including a network management module to monitor and configure the set of network elements, the network management module to configure the set of network elements to enable dynamic insertion of a network service device into the network to logically couple to one or more host devices in the set of host devices to the network service device independently of a location of the one or more host devices and the network service device within the physical topology.

In one embodiment of the network system, upon insertion of a network service device into the network, the network management device can configure the set of network elements in a logical topology that differs from the physical topology, the logical topology to direct data flow of network traffic to the network service device independently of the physical topology of the set of network elements. In one embodiment the network management module is to configure the logical topology of the network elements using one or more virtual local area networks (VLANs), the network service device is assigned a dedicated service VLAN and the network elements are to re-direct network data to the network service device via translation of network data to the dedicated service VLAN. In one embodiment the set of network elements includes a first network element coupled to a first host device in the set of host devices, the first network element can automatically re-direct network data addressed to the first host device to the network service device when the network service device is coupled to the network.

The network service device can be a firewall device, a network filtering device, a network data cache, or any other device or apparatus configured to provide one or more network services to devices coupled via the network. Where the network service device is a firewall device, the firewall device can define a trusted zone and an untrusted zone within the network. Traffic from a network device in the untrusted zone to a network device in the trusted zone is automatically re-directed through the firewall device independently of the location of the firewall device within the physical topology of the set of network elements, such that the firewall device is not required to be physically located between the devices. However, traffic between network devices within the trusted zone is dependent upon and follows the physical topology of the network and is not re-directed to the firewall device.

One embodiment provides for a non-transitory machine-readable medium storing instructions which, when executed by one or more processors, cause the one or more processors to perform operations in response to the coupling of a network service device to the network, the operations comprising verifying availability of resources to implement insertion of the network service device and enabling network data re-direction for the network service device, wherein enabling network data re-direction includes configuring a network element to re-direct data flow associated with a client of the network service device independently of the physical location of the network service device within the network.

In one embodiment the resources to implement insertion of the network service device include virtual local area network (VLAN) resources and virtual network identifier (VNI) resources. In one embodiment the operations additionally include verifying that the service device remains in operation and automatically disabling network data re-direction when the service device is not in operation. In one embodiment the operations additionally include detecting movement of a client device of the network service device from a first network location to a second network location and re-configuring the network based on the movement. In one embodiment, re-configuring the network based on the movement includes automatically disabling re-direction to the network service device on a first network element associated with the first network location and automatically enabling the re-direction on a second network element associated with the second network location.

One embodiment provides for a network element comprising a control plane including logic to receive configuration data for the network element, the configuration data to cause the network element to configure a network tunnel having a first endpoint at a network service device that provides a network service to one or more network service client devices coupled to the network element and a second endpoint at one or more of the network service client devices, and a data plane to forward network data from a first interface coupled to the one or more network service client devices and a second interface coupled to the network service device over the network. In one embodiment the first interface of the network element is directly attached to the one or more network service client devices. In one embodiment the second interface is coupled to the network service device over a layer-3 fabric. In one embodiment the network service device is associated with a dedicated virtual local area network (VLAN). The network tunnel can be associated with the dedicated VLAN and the data plane can be configured to forward network data to the network service device via the dedicated VLAN.

In one embodiment the data plane of the network element can forward network data received via the dedicated VLAN to the one or more network service client devices coupled to the first interface, where the one or more network service client devices can include a first client device, a second client device, and a third client device. The first client device and the second client device can be virtual devices within separate virtual machines (VMs) and the third client device can be a host device for the first and second client device.

In on embodiment the network service device is a network security device, and may be a firewall device, a denial of service attack (DOS) scrubber device, a network data cache and/or a network data filter. In one embodiment the network data filter is a web cache of a web content filter.

One embodiment provides for a network system comprising a set of network elements to interconnect a set of host devices, the set of network elements having a physical topology defined by the physical links between network elements in the set of network elements and a logical topology defined by a flow of network data between a network service device and a client of the network service device, wherein the physical topology differs from the logical topology, and a network management device including a service policy module to monitor a service policy of the network service device and automatically configure the logical topology of the network elements based on a change in the service policy. In a further embodiment the service policy module, in response to a change in the service policy, is further configured to determine intent of the service policy based on definitions in the service policy, the definitions including one or more of a service or a service zone. In one embodiment to determine the intent of the service policy includes to determine a set of network configuration rules implied by the service policy.

In one embodiment the service device is a security service device, the service zones are security zones, and the intent of the service policy is to provide network data security to a trusted security zone of the network. The service policy module can verify the service device before the service policy is retrieved from the service device. In one embodiment in order to verify the service device the service policy module may query the service device for the network element to which the service devices reports to be connected and confirm the network element to which the service device reports to be connected using a network management module on the network management device. In one embodiment a configuration rule implied by the service policy includes to filter network data traffic into the trusted security zone from an untrusted security zone.

In one embodiment the service device is a firewall service device. For the firewall service device, the service policy module can be configured to verify the configuration of the firewall device in response to detection of the firewall service device on the network, retrieve the service policy from the firewall service device, define an intercept specification including criteria to use identify and intercept firewall network traffic, and configure a network provisioning request to implement the intercept specification. The set of network elements can be configured to configure one or more network tunnels to re-direct intercepted firewall traffic to the firewall service device based on the network provisioning request.

One embodiment provides for a non-transitory machine-readable medium storing instructions which, when executed by one or more processors, cause the one or more processors to perform operations in response to the coupling of a network service device to the network, the operations comprising discovering a service policy of the service device using a native API of the service device and automatically configuring a network element to implement the service policy of the service device. In one embodiment the detection of a new service device includes receiving notification of a presence of the new service device from a device discovery module of a network management system, wherein the network management system has access to the configuration of the network element. In one embodiment the detection of a new service device includes receiving notification of a presence of the new service device from a service device management tool associated with the service device. In one embodiment discovering the policies of service device using service device native API includes querying an API library sub-module for a set of commands in the service device native API.

In one embodiment automatically configuring the network to implement the policies includes generating a set of network configuration changes to insert the service device into the network and distributing the set of network configuration changes to one or more network elements on the network. Generating the set of network configuration changes to insert the service device can include determining intent of the policy based on definitions within the policy, the definitions including one or more of a service or a service zone. In one embodiment determining intent of the policy based on definitions within the policy includes determining a set of network configuration rules implied by the policy.

In one embodiment the operations further comprise monitoring the service device for a change in the policy. Monitoring the service device for a change in the policy can include periodically polling the service device for the policy and comparing the policy to a cached version of the policy. Monitoring the service device for a change in the policy may also include receiving a notice of a change in the policy of the service device in response to a change in the policy and retrieving an updated policy in response to the notice. In one embodiment the operations further comprise automatically configuring the network to implement a change in the policy in response to detecting a change in the policy.

One embodiment provides for a method of automatically integrating a network service device into a network in response to the coupling of the network service device to the network, the method comprising discovering a service policy of the service device using a native API of the service device, automatically configuring a network element to implement the service policy of the service device by generating a set of network configuration changes to insert the service device into the network, and distributing the set of network configuration changes to one or more network elements coupled to the network, the network elements to dynamically configure a logical topology of the network to integrate the service device into the network.

In a further embodiment generating the set of network configuration changes to insert the service device includes determining intent of the policy based on definitions within the policy, the definitions including one or more of a service or a service zone, wherein the service zone is defined by a set of hosts or address ranges that define a set of service clients of the network service device. One embodiment additionally comprises verifying the configuration of the service device in response to the detection of the service device on the network, retrieving the service policy from the service device, defining an intercept specification including criteria to use in to identify and intercept network traffic to be re-directed to the service device, and configuring a network provisioning request to implement the intercept specification. In one embodiment the one or more network elements are further to configure one or more network tunnels to re-direct intercepted traffic associated with the service device to the service device based on the network provisioning request. The service device may be a firewall service device, but may also be any one or more of a network filtering device or network data caching devices.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network system comprising:
a set of network elements to interconnect a set of host devices, the set of network elements having a physical topology defined by a set of physical links between network elements in the set of network elements; and
a network management device including a network management module to monitor and configure the set of network elements, the network management module, in response to detecting a network service device coupled to one of the set of network elements, to configure the set of network elements to enable dynamic insertion of a network service device into the network to logically couple to one or more host devices in the set of host devices to the network service device independently of a location of the one or more host devices and the network service device within the physical topology, the network management device is to configure the set of network elements in a logical topology that differs from the physical topology, the logical topology to direct data flow of network traffic to the network service device independently of the physical topology of the set of network elements, and the network management module is to further configure the logical topology of the network elements using one or more virtual local area networks (VLANs), the network service device is assigned a dedicated service VLAN and the network elements are to re-direct network data to the network service device via translation of network data using a tunnel VLAN to the dedicated service VLAN.

2. The system as in claim 1, wherein the set of network elements includes a first network element coupled to a first host device in the set of host devices, the first network element to automatically re-direct network data addressed to the first host device to the network service device when the network service device is coupled to the network.

3. The system as in claim 2, wherein the network service device is a firewall device, network filtering device, or network data cache.

4. The system as in claim 3, wherein the network service device is a firewall device.

5. The system as in claim 4, wherein the firewall defines a trusted zone and an untrusted zone and network traffic between the untrusted zone and the trusted zone is automatically re-directed through the firewall device independently of the location of the firewall device within the physical topology of the set of network elements.

6. The system as in claim 5, wherein the data flow of network traffic within the trusted zone is dependent upon the physical topology of the network elements.

7. The network system of claim 2, wherein the first host device is coupled to a first leaf network element coupled to the tunnel VLAN and the network service device is coupled to a second leaf network element that is coupled to the tunnel VLAN.

8. The network system of claim 1, wherein the set of network elements are in a leaf-spine topology and the network service device is coupled to a leaf network element.

9. The network system of claim 8, where the leaf network element is a top-of-the-rack network element.

10. A non-transitory machine-readable medium storing instructions which, when executed by one or more processors, cause the one or more processors to perform operations, the operations comprising:
in response to detecting a network service device coupled to the network,
verifying availability of resources to implement insertion of the network service device, and
enabling network data re-direction for the network service device, wherein enabling network data re-direction includes configuring a network element to re-direct data flow associated with a client of the network service device to the network service device via a logical topology using a tunnel virtual local area network (VLAN) that is coupled to a service VLAN, wherein the network element is part of a set of network elements coupled in the logical topology that differs from a physical topology of the set of network elements, the logical topology to a direct data flow of network traffic to the network service device, and configuring the logical topology of the set of network elements using one or more VLANs, the network service device is part of the service VLAN, and the data flow of the re-directed data is independent of a physical location of the network service device.

11. The medium as in claim 10, wherein the resources to implement insertion of the network service device include VLAN resources and virtual network identifier (VNI) resources.

12. The medium as in claim 10, the operations additionally including verifying that the service device remains in operation and automatically disabling network data re-direction when the service device is not in operation.

13. The medium as in claim 10, the operations additionally including detecting movement of a client device of the network service device from a first network location to a second network location and re-configuring the network based on the movement.

14. The medium as in claim 13, the re-configuring the network based on the movement includes automatically disabling re-direction to the network service device on a first network element associated with the first network location and automatically enabling the re-direction on a second network element associated with the second network location.

15. A network element comprising:
a control plane including logic to receive configuration data for the network element in response to a detection of a network service device coupling to a network that includes the network element, the configuration data to cause the network element to configure a tunnel virtual local area network (VLAN) having a first endpoint at a network service device that provides a network service to one or more network service client devices coupled to the network element and a second endpoint at one or more of the network service client devices, wherein the tunnel VLAN is coupled to a dedicated VLAN of the network service device, the network element is part of a set of network elements coupled in a logical topology that differs from a physical topology of the set of network elements, the logical topology to direct a data flow of network traffic to the network service device, and configuring the logical topology of the set of network elements using one or more VLANs; and
a data plane to forward network data from a first interface coupled to the one or more network service client devices and a second interface coupled to the network service device over the network.

16. The network element as in claim 15, wherein the first interface is directly attached to the one or more network service client devices.

17. The network element as in claim 15, wherein the second interface is coupled to the network service device over a layer-3 fabric.

18. The network element as in claim 15, wherein the VLAN tunnel is associated with the dedicated VLAN and the data plane is to forward the network data to the network service device via the dedicated VLAN.

19. The network element as in claim 18, wherein the data plane is further to forward network data received via the dedicated VLAN to the one or more network service client devices coupled to the first interface.

20. The network element as in claim 19, wherein the one or more network service client devices includes a first client device, a second client device, and a third client device, wherein the first client device and the second client device are virtual devices within separate virtual machines (VMs) and the third client device is a host device for the first and second client device.

21. The network element as in claim 15, wherein the network service device is a network security device.

22. The network element as in claim 21, wherein the network service device is a firewall device.

23. The network element as in claim 21, wherein the network service device is a denial of service attack (DOS) scrubber device.

24. The network element as in claim 15, wherein the network service device is a network data cache or a network data filter.

25. The network element as in claim 24, wherein the network data filter is a web data cache or a web content filter.

* * * * *